United States Patent
Jiang et al.

(10) Patent No.: US 11,120,616 B2
(45) Date of Patent: Sep. 14, 2021

(54) METHOD FOR IMPLEMENTING VIRTUAL SCENE CONVERSION AND RELATED APPARATUS

(71) Applicant: Tencent Technology (Shenzhen) Company Limited, Shenzhen (CN)

(72) Inventors: Huifu Jiang, Shenzhen (CN); Feng Xue, Shenzhen (CN); Nan Liu, Shenzhen (CN); Yifan Guo, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/916,586

(22) Filed: Jun. 30, 2020

(65) Prior Publication Data

US 2020/0334893 A1  Oct. 22, 2020

Related U.S. Application Data

(63) Continuation of application No. PCT/CN2019/080081, filed on Mar. 28, 2019.

(30) Foreign Application Priority Data

Apr. 28, 2018 (CN) .......................... 201810407493.9

(51) Int. Cl.
*G06T 19/00* (2011.01)
*G06T 15/20* (2011.01)
*G06F 3/01* (2006.01)

(52) U.S. Cl.
CPC .............. *G06T 15/20* (2013.01); *G06F 3/011* (2013.01); *G06T 19/006* (2013.01); *G06T 2219/012* (2013.01)

(58) Field of Classification Search
None
See application file for complete search history.

(56) References Cited

U.S. PATENT DOCUMENTS

2016/0299563 A1* 10/2016 Stafford ............... G06F 3/0487

FOREIGN PATENT DOCUMENTS

| CN | 106157359 A | 11/2016 |
|---|---|---|
| CN | 106227352 A | 12/2016 |

(Continued)

OTHER PUBLICATIONS

International Search Report and Written Opinion with English Translation for International Application No. PCT/CN2019/080081 dated Jun. 13, 2019; 12 pages.

*Primary Examiner* — Nicholas R Wilson
(74) *Attorney, Agent, or Firm* — Crowell & Moring LLP

(57) ABSTRACT

Embodiments of this application disclose a method for implementing virtual scene conversion. The method in the embodiments includes: displaying an initial virtual scene, a first scene conversion trigger set, and partial information of at least one target virtual scene in a screen area, a scene conversion trigger being used for implementing conversion between associated different virtual scenes; determining, in a case that a trigger operation on the first scene conversion trigger is received, the target virtual scene and a second scene conversion trigger set based on the first scene conversion trigger operation in the initial virtual scene, the second scene conversion trigger set including at least one second scene conversion trigger associated with a plurality of determined target virtual scenes; and rendering and displaying the target virtual scene and the second scene conversion trigger set in the screen area. The embodiments of this application are used for improving adaptability of different services and increasing application scenarios.

19 Claims, 16 Drawing Sheets

(56) References Cited

FOREIGN PATENT DOCUMENTS

| | | |
|---|---|---|
| CN | 106484123 A | 3/2017 |
| CN | 107678546 A | 2/2018 |
| CN | 108665553 A | 10/2018 |
| WO | WO 2018/005557 A1 | 1/2018 |

* cited by examiner

METHOD FOR IMPLEMENTING VIRTUAL SCENE CONVERSION AND RELATED APPARATUS

RELATED APPLICATION

This application is a continuation application of the International PCT Application No. PCT/CN2019/080081, filed with the Chinese Patent Office on Mar. 28, 2019 which claims priority to Chinese Patent Application No. 2018104074939, entitled "METHOD FOR IMPLEMENTING VIRTUAL SCENE CONVERSION AND RELATED APPARATUS" and filed with the Chinese Patent Office on Apr. 28, 2018, which are incorporated herein by reference in their entireties.

FIELD OF THE TECHNOLOGY

This application relates to the field of computer and information application, and in particular, to a technology for implementing virtual scene conversion.

BACKGROUND OF THE DISCLOSURE

With the rapid development of interne technologies, and the upgrade of information technologies, the emerging Augmented Reality (AR) technology gradually step into the public, and various AR interactive system researches gradually become hot issues concerned by the public.

AR has a wide range of applications. For example, within current AR applications, there is an application called AR portal. An effect of the AR portal is that there is a virtual gate in the real world, through which a user can see another virtual world (or a virtual room). For example, the AR application is running on a mobile phone. As the mobile phone moves, when a virtual object in the virtual world reaches the portal, the mobile phone renders the virtual world, so that users are visually immersed in travelling the real world to another world. Users can experience travel from the real world to only one other world in the current AR portal technology.

Currently, the limitation on only one other world may be travelled to by using the AR portal, limits application fields in which AR portal can be applied.

SUMMARY

Embodiments of this application provide a method and a device for implementing virtual scene conversion, to improve adaptability of different augmented reality/virtual reality services and increase application scenarios of augmented reality/virtual reality.

According to a first aspect, an embodiment of this application provides a method for implementing virtual scene conversion, including:

displaying an initial virtual scene, a first scene conversion trigger set, and partial information of at least one target virtual scene in a screen area, a scene conversion trigger being used for implementing conversion between associated different virtual scenes, and the first scene conversion trigger set including at least one first scene conversion trigger associated with the initial virtual scene;

determining, in a case that a trigger operation on the first scene conversion trigger is received, a determined target virtual scene and a second scene conversion trigger set based on the trigger operation, the second scene conversion trigger set including at least one second scene conversion trigger associated with the determined target virtual scene; and rendering the determined target virtual scene and the second scene conversion trigger set, and displaying the determined target virtual scene and second scene conversion trigger set in the screen area.

According to a first aspect, an embodiment of this application provides an apparatus for implementing virtual scene conversion, including:

a display module configured to display an initial virtual scene, a first scene conversion trigger set, and partial information of at least one target virtual scene in a screen area, a scene conversion trigger being used for implementing conversion between associated different virtual scenes, and the first scene conversion trigger set including at least one first scene conversion trigger associated with the initial virtual scene;

a first determining module configured to determine, in a case that a trigger operation on the first scene conversion trigger is received, the target virtual scene and a second scene conversion trigger set based on the trigger operation, the second scene conversion trigger set including at least one second scene conversion trigger associated with the determined target virtual scenes;

a rendering module configured to render the determined target virtual scene and second scene conversion trigger set; and the display module being further configured to display the determined target virtual scene and second scene conversion trigger set in the screen area.

According to a third aspect, an embodiment of this application provides a terminal, including:

a memory configured to store a computer executable program code;

a transceiver; and a processor coupled to the memory and the transceiver, the program code including an instruction, the instruction, when being executed by the processor, causing the terminal to perform the method according to the first aspect.

According to a fourth aspect, an embodiment of this application provides a computer storage medium configured to store a computer software instruction used for a terminal, the instruction including a program for performing the method according to the first aspect.

According to a fifth aspect, an embodiment of this application provides a computer program product including an instruction, the instruction, when being run on a computer, causing the computer to perform the method according to the first aspect.

It may be learned from the foregoing technical solutions that the embodiments of this application have the following advantages:

In the embodiments of this application, the initial virtual scene and the first scene conversion trigger set for triggering scene conversion are displayed on the screen area of the terminal, the first scene conversion trigger set including at least one first scene conversion trigger associated with the initial virtual scene. If the initial virtual scene is a virtual reality scene, the first scene conversion trigger set includes at least one first scene conversion trigger. If the initial virtual scene is an augmented reality scene, the first scene conversion trigger set includes at least two first scene conversion triggers. If one of the first scene conversion triggers is triggered, the terminal switches the virtual scene from the initial virtual scene to the target virtual scene associated with the first scene conversion trigger, and the target virtual scene and the second scene conversion trigger set in the target virtual scene are displayed on the screen area. In this case, the target virtual scene becomes the initial virtual scene, and correspondingly, the second scene conversion trigger set in the target virtual scene becomes the first scene conversion trigger set. In the embodiments of this application, conversion between a plurality of virtual scenes can be implemented, so that a user visually feels to travel amongst a plurality of virtual scenes, improving adaptability of different augmented reality/virtual reality/mixed reality services and increase application scenarios of augmented reality/ virtual reality/mixed reality.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
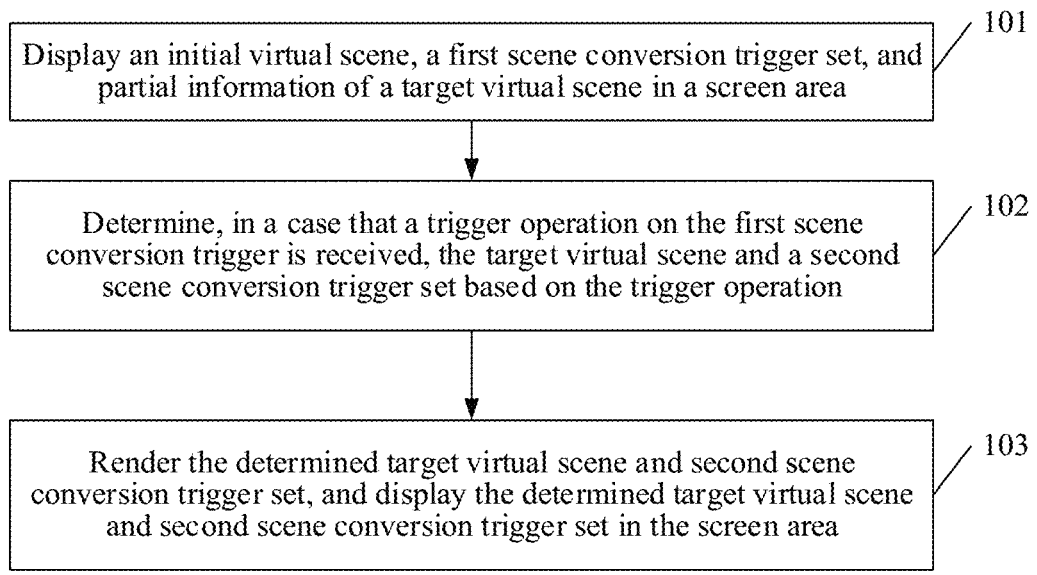
FIG. 1 is a schematic flowchart of an exemplary method for implementing virtual scene conversion according to an embodiment of this application.

Embodiments of this application provide a method for implementing virtual scene conversion and a related apparatus, to improve adaptability of different virtual reality/ augmented reality services and increase application scenarios of virtual reality/augmented reality.

To make a person skilled in the art better understand solutions of this application, the following clearly and completely describes the technical solutions in the embodiments of this application with reference to the accompanying drawings in the embodiments of this application. Apparently, the described embodiments are merely some rather than all of the embodiments of this application. All other embodiments obtained by persons skilled in the art based on the embodiments of this application without creative efforts shall fall within the protection scope of this application. In the embodiments of this application, "a plurality of" refers to two or more.

In the specification, claims, and accompanying drawings of this application, the terms "first", "second", "third", "fourth", and the like (if existing) are intended to distinguish between similar objects rather than describe a specific sequence or a precedence order. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of this application provides a method for implementing virtual scene conversion. The method may be applied to displaying of a virtual scene in augmented reality (AR), virtual reality (VR), and mixed reality (MR). The embodiment is described by using an augmented reality application as an example. In actual applications, a specific application scenario is not limited. Virtual reality is a new type of computer technology evolving from various information technologies such as computer vision and human-computer interaction, etc. With a display device, people can travel to be immersed in a completely virtual world by separating vision from a real world. Augmented reality is to overlay virtual information onto a specific position based on an identified object, in which virtual information can be exchanged in real time to enhance a visual effect. As a combined product of virtual reality and augmented reality, mixed reality is a new, interactive, and visual environment that combines a real world and a virtual, in which digital and physical objects coexist.

The method is applied to a terminal. The terminal includes a camera and a display screen. The terminal may be a mobile phone, a laptop computer, a computer, a head-mounted device (such as VR glasses or a VR helmet), etc. In the embodiments of this application, for example, the terminal may be a mobile phone.

In the embodiments of this application, an initial virtual scene, a first scene conversion trigger set (for example, a portal set in the initial virtual scene), and partial information of at least one target virtual scene is displayed in a screen area of the terminal. A scene conversion trigger is used for implementing conversion between associated different virtual scenes. The virtual scene includes an initial virtual scene and at least one target virtual scene. The virtual scene may be an augmented reality scene, a virtual reality scene, or a mixed reality scene. The virtual scene belongs to a virtual scene set including a plurality of virtual scenes. The first scene conversion trigger set includes at least one first scene conversion trigger associated with the initial virtual scene. If the terminal receives a trigger operation on a first scene conversion trigger, the terminal determines the target virtual scene and a second scene conversion trigger set based on the first scene conversion trigger operation in the initial virtual scene. The second scene conversion trigger set includes at least one second scene conversion trigger associated with the determined target virtual scenes. The terminal renders the determined target virtual scene and second scene conversion trigger set, and displays the target virtual scene and the second scene conversion trigger set corresponding to the target virtual scene in the screen area.

In the embodiments of this application, the initial virtual scene and the first scene conversion trigger set (for example, a portal set in the initial virtual scene) for triggering scene conversion are displayed on the screen area of the terminal, the first scene conversion trigger set including at least one first scene conversion trigger associated with the initial virtual scene. If the initial virtual scene is a virtual reality scene, the first scene conversion trigger set includes at least one first scene conversion trigger. If the initial virtual scene is an augmented reality scene, the first scene conversion trigger set includes at least two first scene conversion triggers. If one of the first scene conversion triggers is triggered, the terminal switches the virtual scene from the initial virtual scene to the target virtual scene associated with the one of the first scene conversion triggers, and the target virtual scene and the second scene conversion trigger set in the target virtual scene are displayed on the screen area. In this case, upon the completion of the virtual scene conversion, the target virtual scene becomes the initial virtual scene, and the second scene conversion trigger set in the target virtual scene becomes the first scene conversion trigger set. In the embodiments of this application, conversion between a plurality of virtual scenes can be implemented, so that a user visually feels to travel amongst a plurality of virtual scenes, improving adaptability of different augmented reality/virtual reality/mixed reality services and increase application scenarios of augmented reality/virtual reality/mixed reality. In this application, conceptual wise, a portal in the virtual scene is similar to a door, a gate, or an entrance, and user may enter another virtual scene by entering the portal.

The method may be applied to various augmented reality/virtual reality/mixed reality services and scenarios. For example, the method may be applied to game services, in which players may travel amongst different scenarios to complete tasks. Alternatively, the method may be applied to military training services. Users may travel amongst a plurality of different scenes (for example, a land scene, an ocean scene, an urban scene, a jungle scene) to complete different combat missions. Alternatively, the method may be further applied to a tourism service. Users may select different cities or scenic spots for travelling. In the virtual world, the users have a sense being in reality. The users can enjoy beautiful scenery without leaving houses. Services and scenarios to which the embodiments of this application may be applied are not limited in the embodiments of this application.

For ease of understanding, terms in the embodiments of this application are described first.

A virtual scene set includes a plurality of virtual scenes that may be pre-built three-dimensional scenes, there is an association relationship among the plurality of virtual scenes. For example, the virtual scene may be a desert scene, a land scene, an ocean scene, etc. The virtual scene is built according to different services, and a specific scene is not limited in actual applications.

A virtual scene may be an initial virtual scene or a target virtual scene. The initial virtual scene may be a virtual reality scene or an augmented reality scene. The initial virtual scene may be a three-dimensional space scene (a three-dimensional world) in which a virtual object is located. The target virtual scene is a virtual scene to which the initial virtual scene is to be switched or converted to. There is only one initial virtual scene, and there may be a plurality of target virtual scenes. The virtual scenes belong to a virtual scene set. For example, the initial virtual scene is a desert scene, and the desert scene is associated with a land scene and an ocean scene. In this case, the land scene and the ocean scene may be the target virtual scenes. After switching from the desert scene to the land scene, the land scene becomes the initial virtual scene. Therefore, the initial virtual scene and target virtual scene are relative concepts, as after a scene conversion, a target virtual scene may be switched to an initial virtual scene.

A scene conversion trigger is used for switching between different associated virtual scenes, and is further used for displaying partial information of the target virtual scene at a scene conversion trigger position. The scene conversion trigger may be an area, or may be an animation rendered in the area. In an actual application scenario, the scene conversion trigger may be a virtual portal, a cave entrance, a door, or a gate, etc. Rendering the partial information of the target virtual scene at the position of the scene conversion trigger means that a user may enter a next virtual scene by using the scene conversion trigger (in the embodiments of this application, the "virtual scene" may also be referred to as a "virtual world" or a "world"). According to an angle and a position of a virtual object, the user can see the target virtual scene from the portal.

A first scene conversion trigger set is a scene conversion trigger set corresponding to the initial virtual scene. The set includes a plurality of first scene conversion triggers. The plurality of first scene conversion triggers may be arranged in series, in parallel, or a mixture of in series and in parallel. The term "in series" means the conversion triggers have a sequential relationship, for example, trigger 1 needs to be triggered first, then trigger 2, then trigger 3. On the other hand, in parallel means the conversion triggers may be triggered in parallel, for example, any one of trigger 1 or trigger 2, or trigger 3 may be triggered without a specific sequential order.

A second scene conversion trigger set is a scene conversion trigger set corresponding to the target virtual scenes. The set includes a plurality of second scene conversion triggers. The plurality of second scene conversion triggers may be arranged in series, in parallel, or a mixture of in series and in parallel.

This application is described below by using specific embodiments. Referring to FIG. 1, this application provides an embodiment of a method for implementing virtual scene conversion, including the following steps.

Step 101: Display an initial virtual scene, a first scene conversion trigger set, and partial information of at least one target virtual scene in a screen area.

The screen area includes a first virtual area and a second virtual area. The first virtual area is used for displaying the initial virtual scene and the first scene conversion trigger set. The second virtual area is used for displaying the target virtual scene in the initial virtual scene. The first virtual area and the second virtual area constitute the entire screen area.

The initial virtual scene may be a virtual scene, an augmented reality scene, or a mixed reality scene. For example, if the initial virtual scene is an augmented reality scene, a real scene image of the real scene needs to be obtained through a camera. The initial virtual scene includes the real scene image. If the initial virtual scene is a virtual reality scene, the initial virtual scene includes a virtual image, which is not specifically limited in an actual application scenario.

The scene conversion trigger is used for implementing conversion between associated different virtual scenes, and the first scene conversion trigger set includes at least one first scene conversion trigger associated with the initial virtual scene.

In this example, the terminal is a mobile phone. The initial virtual scene, the first scene conversion trigger set, and the partial information of at least one target virtual scene are displayed in the whole screen area of the mobile phone. Alternatively, the initial virtual scene, the first scene conversion trigger set, and the partial information of at least one target virtual scene may be displayed in partial of a screen area of the mobile phone.

The first scene conversion trigger set corresponds to the initial virtual scene. In this example, the number of first scene conversion triggers included in the first scene conversion trigger set is not limited. In this particular example, there are two first scene conversion triggers.

It may be understood that, in this example, the initial virtual scene and the two first scene conversion triggers corresponding to the initial virtual scene are displayed in the screen area. The initial virtual scene is associated with the target virtual scene through the first scene conversion triggers. The partial information of at least one target virtual scene is displayed in an area corresponding to the first scene conversion trigger.

Figure 2:
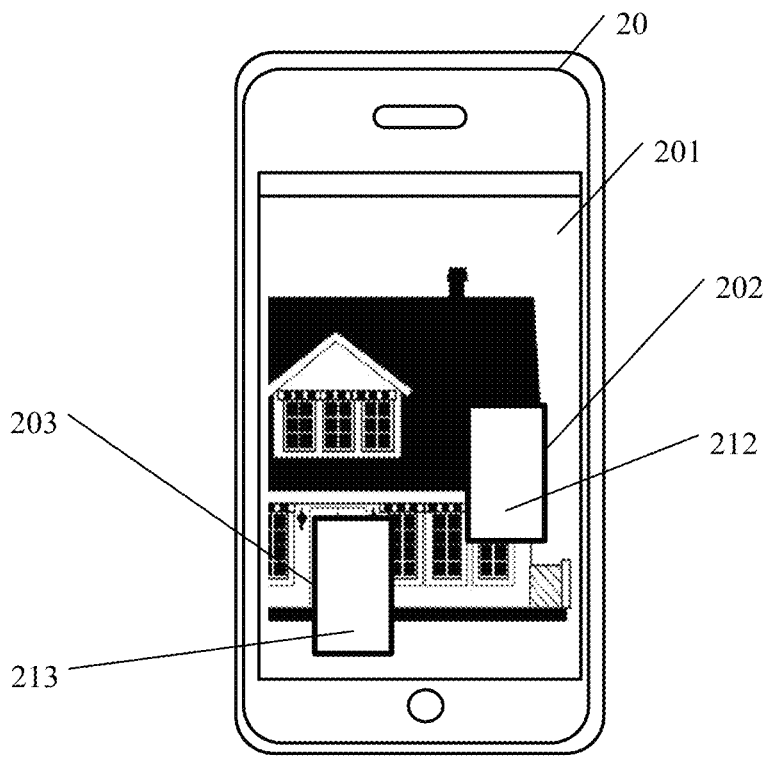
FIG. 2 is a schematic diagram of another application scenario according to an embodiment of this application.

Referring to FIG. 2, FIG. 2 is a schematic diagram of an application scenario according to an embodiment of this application.

An initial virtual scene 201 (for example, a house image) is displayed in the screen area of the mobile phone. The initial virtual scene corresponds to two first scene conversion triggers, which are respectively a first scene conversion trigger 202 and a first scene conversion trigger 203. A first target virtual scene 212 (for example, a desert scene) is displayed in an area corresponding to the first scene conversion trigger 202. The initial virtual scene 201 is associated with the first target virtual scene 212 (for example, a desert scene) through the first scene conversion trigger 202, and the initial virtual scene 201 is associated with the first target virtual scene 213 (for example, a forest scene) through the first scene conversion trigger 203. In an application scenario, a user can see the initial virtual scene (for example, a house) and the two first scene conversion triggers (for example, two portals) of the initial virtual scene. Through each portal, the user can see different target virtual scenes. For example, through the first portal, the user can see partial information of a desert scene, and through the second portal, the user can see partial information of a forest scene.

Step 102: Determine, in a case that a trigger operation on the first scene conversion trigger is received, the target virtual scene and a second scene conversion trigger set based on the trigger operation.

The first scene conversion trigger in this step is any first scene conversion trigger in the initial virtual scene displayed on the screen.

The mobile phone detects position information of the mobile phone, calculates the position of the virtual object in the initial virtual scene according to the position information of the mobile phone, and determines, according to whether the position of the virtual object reaches the position of a first scene conversion trigger, whether a trigger operation on the first scene conversion trigger is received.

If the terminal detects that the position of the virtual object reaches the first scene conversion trigger, the terminal determines the target virtual scene (for example, a forest scene) associated with the first scene conversion trigger and a position of the second scene conversion trigger set corresponding to the target virtual scene (in this case, the forest scene).

There is a mapping relationship between a position of the terminal in the real scene and the position of the virtual object in the virtual scene. In one example, a user holding the mobile phone moves. The terminal detects the position of the terminal in real time and calculates the position of the virtual object in the initial position according to the position information of the terminal. When the position of the virtual object reaches the position of a first scene conversion trigger, the terminal determines that a trigger operation on the first scene conversion trigger is received. The terminal determines a position of the second scene conversion trigger set corresponding to the target virtual scene (for example, a forest scene), and a second scene conversion trigger (portal) set in the forest scene to be subsequently switched to. The second scene conversion trigger set in the target virtual scene includes at least one second scene conversion trigger.

Step 103: Render the determined target virtual scene and second scene conversion trigger set, and display the determined target virtual scene and second scene conversion trigger set in the screen area.

The terminal renders the determined target virtual scene (for example, a forest scene) and second scene conversion trigger set, and displays the forest scene and a corresponding second scene conversion trigger set in the forest scene in the screen area. In this case, the initial virtual scene switches to the forest scene, and the corresponding portal set in the forest scene becomes the first scene conversion trigger set, thus facilitating the step of switching the initial virtual scene to the target virtual scene.

From a user's perspective, a user visually feels like travelling from a current house scene to the forest scene. Similarly, when the terminal detects that the position of the virtual object reaches a position of another portal, the terminal determines a position of the second scene conversion trigger set corresponding to the target virtual scene (for example, a desert scene), and a portal set in the forest scene to be subsequently switched to. Similarly, the desert scene may further include a scene conversion trigger set corresponding to at least one next target virtual scene from the desert scene.

In the embodiments of this application, the initial virtual scene and the first scene conversion trigger set for triggering scene conversion are displayed on the screen area of the terminal, the first scene conversion trigger set including at least one first scene conversion trigger associated with the initial virtual scene. If the initial virtual scene is a virtual reality scene, the first scene conversion trigger set includes at least one first scene conversion trigger. If the initial virtual scene is an augmented reality scene, the first scene conversion trigger set includes at least two first scene conversion triggers. If one of the first scene conversion triggers is triggered, the terminal switches the virtual scene from the initial virtual scene to the target virtual scene associated with the first scene conversion trigger, and the target virtual scene and the second scene conversion trigger set in the target virtual scene are displayed on the screen area. In this case, upon the completion of the scene conversion, the target virtual scene becomes the initial virtual scene, and the second scene conversion trigger set in the target virtual scene becomes the first scene conversion trigger set. In the embodiments of this application, conversion between a plurality of virtual scenes may be implemented, so that a user visually feels to travel amongst a plurality of virtual scenes, improving adaptability of different augmented reality/virtual reality/mixed reality services and increase application scenarios of augmented reality/virtual reality/mixed reality.

In this embodiment of this application, switching among a plurality of scenes is implemented, so that the user feels like travelling among a plurality worlds and being immersive. In this example, different virtual scenes are built according to different services. According to different service requirements, the user travels among different worlds. For example, in a military training service, the user travels among a plurality of different scenes (such as a land scene, an ocean scene, a city scene) to complete different combat missions. Alternatively, the method may be further applied to a tourism service. The user may select a plurality of different cities or scenic spots for traveling. Therefore, the adaptability of different augmented reality/virtual reality services is improved and application scenarios of augmented reality/virtual reality are increased.

In one embodiment, the initial virtual scene may be associated with at least two first scene conversion triggers, one of the at least two first scene conversion triggers being a virtual-real scene conversion trigger used for switching between a virtual scene and a real scene.

A second real scene image in the real scene is collected through a camera. The second real scene image is overlaid at a position of the virtual-real scene conversion trigger. The user can see a real scene through an area corresponding to the virtual-real scene conversion trigger.

When determining the virtual-real scene conversion trigger in the initial virtual scene is triggered, the terminal collects a third real scene image in the real scene according to a real-time angle and a real-time position of the camera, and displays the third real scene image. The terminal performs switching from the initial virtual scene to the real scene, and the user visually feels like travelling from the initial virtual scene to the real scene.

In this embodiment of this application, the scene conversion trigger is further configured to display the partial information of the target virtual scene. Based on this function, the scene conversion trigger may further have different display forms. It may be understood that in an application scenario, the user can see the target virtual scene through the scene conversion trigger. The display forms of the scene conversion trigger are intuitively described from a user's perspective. The display forms of the scene conversion trigger includes: 1. serial arrangement of scene conversion triggers; 2. parallel arrangement of scene conversion triggers; and 3. mixed arrangement of scene conversion triggers, including both serial arrangement and parallel arrangement of scene conversion triggers.

Figure 3:
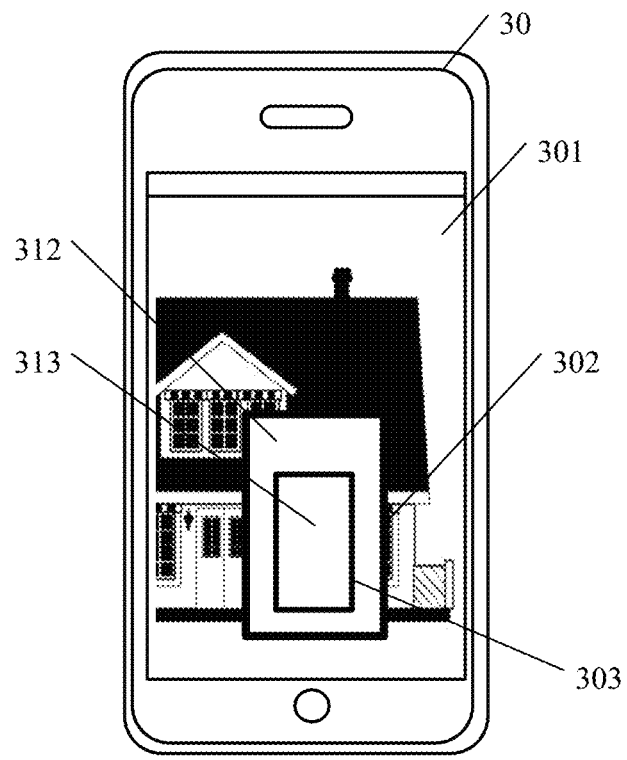
FIG. 3 is a schematic diagram of another application scenario according to an embodiment of this application.

1. Serial arrangement of scene conversion triggers:

In an application scenario, referring to FIG. 3, FIG. 3 is a schematic diagram of an application scenario according to an embodiment of this application. A terminal 30 displays an initial virtual scene 301, and determines a position of a first scene conversion trigger (for example, a portal) 302 in the initial virtual scene 301. A first target virtual scene (for example, a desert scene) 312 is displayed in an area corresponding to the first scene conversion trigger 302, and a second scene conversion trigger (a portal) 303 in the target virtual scene 312 is further displayed in the area corresponding to the first scene conversion trigger 302. The second scene conversion trigger 303 displays partial information of the second target virtual scene (for example, a forest scene) 313. Similarly, more portals and a target virtual scene in each portal may be further displayed inside the second target virtual scene 302. In this embodiment of this application, there may be a plurality of second scene conversion triggers. In this example, a user can see the first target virtual scene 312 (for example, a desert scene) through the first scene conversion trigger 302, and see the second target virtual scene 313 (for example, a forest scene) through the second scene conversion trigger 303 corresponding to the first target virtual scene (for example, a desert scene) 312, and so on.

2. Parallel arrangement of scene conversion triggers:

Referring to FIG. 2, for example, in the initial virtual scene 201, there are two first scene conversion triggers: a first scene conversion trigger 202 and a first scene conversion trigger 203. The first target virtual scene (for example, a desert scene) 212 is displayed in an area corresponding to the first scene conversion trigger 202. The initial virtual scene 201 is associated with the first target virtual scene (for example, a desert scene) 212 through the first scene conversion trigger 202. The initial virtual scene 201 is associated with the first target virtual scene (for example, a forest scene) 213 through the first scene conversion trigger 203.

Figure 4:
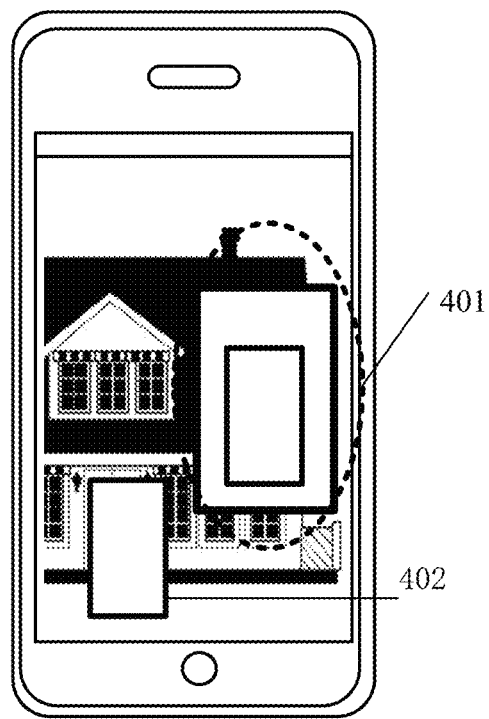
FIG. 4 is a schematic diagram of another application scenario according to an embodiment of this application.

3. Mixed arrangement of scene conversion triggers:

Referring to FIG. 4, in the initial virtual scene, scene conversion trigger 401 and scene conversion trigger 402 are in parallel arrangement, which means either trigger 401 or 402 may be triggered without a sequential order. In the meanwhile, scene conversion trigger 401 itself is configured in a serial arrangement as there are two triggers arranged serially (shown by the small box inside the big box). In this case, the initial virtual scene contains a mixed (serial and parallel) trigger arrangement.

In actual applications, the serial arrangement of scene conversion triggers and the parallel arrangement of scene conversion triggers may be arbitrarily combined in the initial virtual scene. The descriptions herein are merely exemplary, and are not intended for limiting this application.

Figure 5:
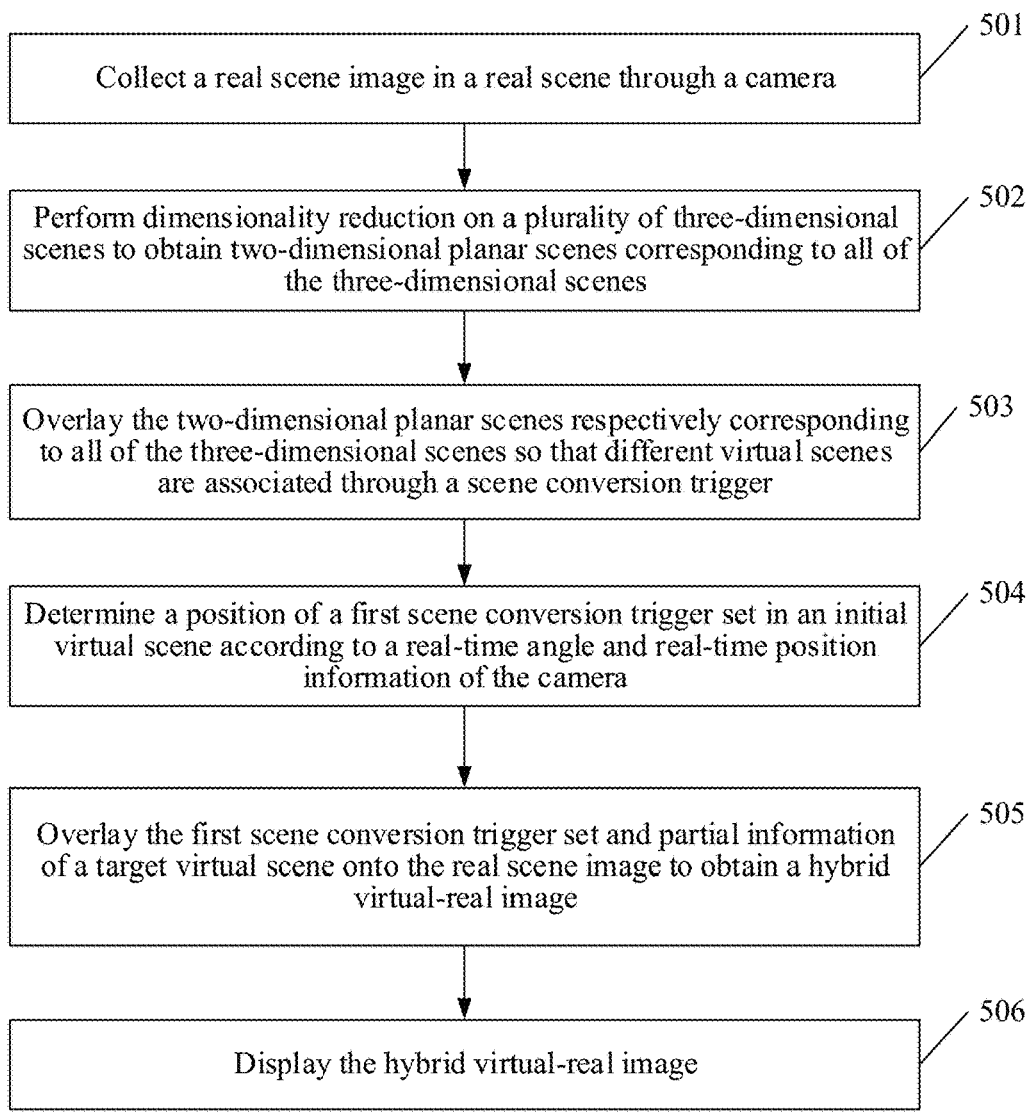
FIG. 5 is a schematic method flowchart of an exemplary method for implementing virtual scene conversion according to an embodiment of this application.

Specific implementation of the three display forms of the scene conversion triggers and switching among different virtual scenes are illustratively described below by using embodiments. Referring to FIG. 5, FIG. 5 is a schematic flowchart of an embodiment of a method for implementing virtual scene conversion according to an embodiment of this application.

This application is described in detail below. In this embodiment, a terminal is used as the augmented reality device.

Step 501: Collect a real scene image in a real scene through a camera.

The terminal detects a real-time angle of the camera and position information of the terminal. The camera collects a real scene image in a real scene under the angle and the position information. For example, in the scenes in FIG. 2 and FIG. 3, a user stands in front of a house, and the camera of the mobile phone collects a real scene image of the house.

Step 501 is an optional step. In a virtual reality scene, step 501 may be skipped and step 502 may be directly performed.

Step 502: Perform dimensionality reduction on all three-dimensional scenes to obtain two-dimensional planar scenes corresponding to all of the three-dimensional scenes.

The terminal performs dimensionality reduction on all stored three-dimensional scenes to obtain the two-dimensional planar scenes corresponding to all of the three-dimensional scenes.

The three-dimensional scene in this embodiment of this application includes the background and all virtual substances in the three-dimensional scene. The plurality of three-dimensional scenes are pre-built according to a service, and are built according to different augmented reality services. For example, in a tourism service, the plurality of three-dimensional scenes may be different scenic spots, such as the Forbidden City, a museum, the Temple of Heaven, etc., or may be indoor scenes or outdoor scenes, which may be specifically built according to an actual situation. Alternatively, in an adventure game service, the plurality of three-dimensional scenes may be forest scenes, desert scenes, land scenes, urban scenes, etc. In this embodiment of this application, the plurality of three-dimensional scenes are pre-built according to a specific service.

Figure 6:
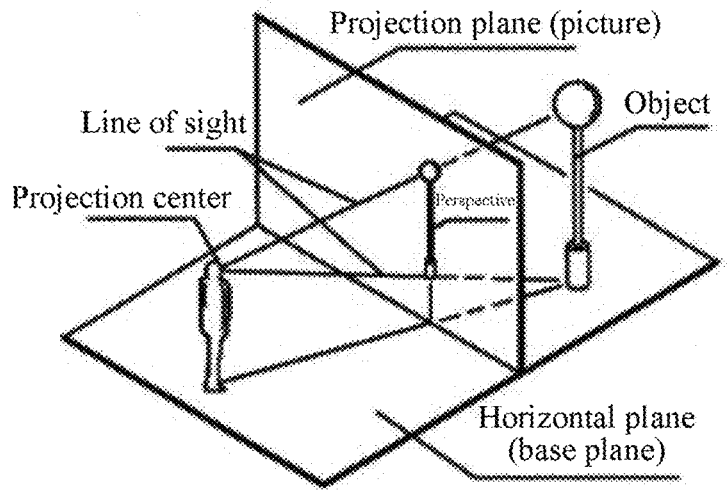
FIG. 6 is a schematic diagram of dimensionality reduction on a three-dimensional scene according to an embodiment of this application.

Referring to FIG. 6, FIG. 6 is a schematic diagram of dimensionality reduction on a three-dimensional scene. Each point on an object is described by using three components (x, y, z) in a three-dimensional coordinate system. A three-dimensional object is projected. Projection means to convert a three-dimensional object into a two-dimensional object through mapping. In FIG. 6, a projection line (or line of sight) is projected from a specific point (which is referred to as a viewpoint or a projection center) in space, and a projection plane is placed between the three-dimensional object and the projection center. The three-dimensional object is perspectively projected onto the projection plane to obtain a two-dimensional image on the projection plane, that is, dimensionality reduction is performed on the three-dimensional image to obtain a two-dimensional planar image. Each three-dimensional scene corresponds to one two-dimensional planar scene, and each two-dimensional scene corresponds to a plurality of two-dimensional planar images.

Step 503: Overlay each of the two-dimensional planar scenes corresponding to the three-dimensional scene respectively, so that different virtual scenes are associated through a scene conversion trigger.

Figure 7:
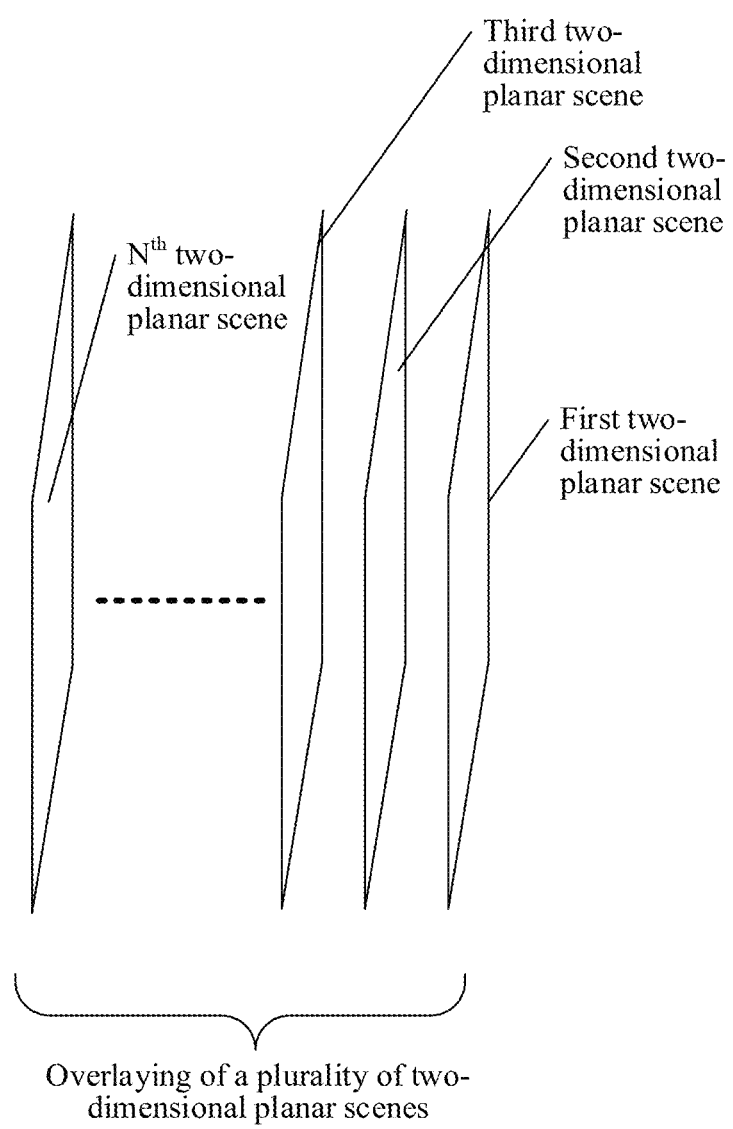
FIG. 7 is a schematic diagram of a two-dimensional planar scene obtained after dimensionality reduction is performed on a three-dimensional scene in a virtual scene set according to an embodiment of this application.

Referring to FIG. 7, FIG. 7 is a schematic diagram of a two-dimensional planar scene obtained after dimensionality reduction is performed on a three-dimensional scene in a virtual scene set. The virtual scene set includes a plurality of overlaid two-dimensional planar scenes. There may be N two-dimensional planar scenes, N being a positive integer greater than or equal to 2. Each of the plurality of two-dimensional planar scenes is one layer in the virtual scene set. The plurality of two-dimensional planar scenes are overlaid to complete overlapping of a plurality of scenes. In this embodiment of this application, dimensionality reduction on the three-dimensional scene is an intermediate process of rendering of the virtual scene, so as to overlay the plurality of three-dimensional scenes and associate the plurality of virtual scenes through the scene conversion trigger. During dimensionality reduction, a plurality of scenes may be overlaid in sequence, and a scene conversion trigger is disposed in each scene. An area corresponding to the scene conversion trigger is made of a perspective material, so that displaying of partial information of a next scene can be seen through the scene conversion trigger.

Step 502 and step 503 are used for obtaining the virtual scene set, and may be performed by a background server. The terminal receives the virtual scene set transmitted by the background server. Step 502 and step 503 are optional steps, and step 504 may be directly performed.

Step 504: Determine a position of the first scene conversion trigger set in the initial virtual scene according to a real-time angle and real-time position information of the camera.

The terminal determines the first scene conversion trigger in the initial virtual scene according to the real-time angle of the camera and position information of the terminal. For example, a portal may be rendered at a position corresponding to the first scene conversion trigger. Different virtual items may be rendered at the position corresponding to the first scene conversion trigger based on actual application scenarios.

Step 505: Overlay the first scene conversion trigger set and the partial information of at least one target virtual scene onto the real scene image to obtain a hybrid virtual-real image.

There may be a plurality of target virtual scenes, including at least a first target virtual scene and a second target virtual scene. For example, the first target virtual scene may be the first virtual scene (for example, a forest scene), and the second target virtual scene may be the second virtual scene (for example, a land scene).

First, there is a mapping relationship between the real-time angle of the camera and a viewing angle corresponding to the virtual object in the virtual scene. The terminal may calculate the viewing angle of the virtual object in the virtual scene according to the real-time angle of the camera, and determines the position information of the terminal through a sensor. There is a mapping relationship between the position information of the terminal and the position of the virtual object in the virtual scene, and the terminal calculates the position of the virtual object in the virtual scene according to the position information of the terminal. The terminal maps the real-time angle of the camera and the position information of the terminal to the viewing angle and the position of the virtual object in the virtual scene, and determines the viewing angle and the position of the virtual object in the virtual scene according to the real-time angle of the camera and the position information. The virtual object may be displayed (for example, the virtual object may be a virtual character), or not displayed, that is, a user cannot see the virtual object in the virtual scene.

Figure 8:
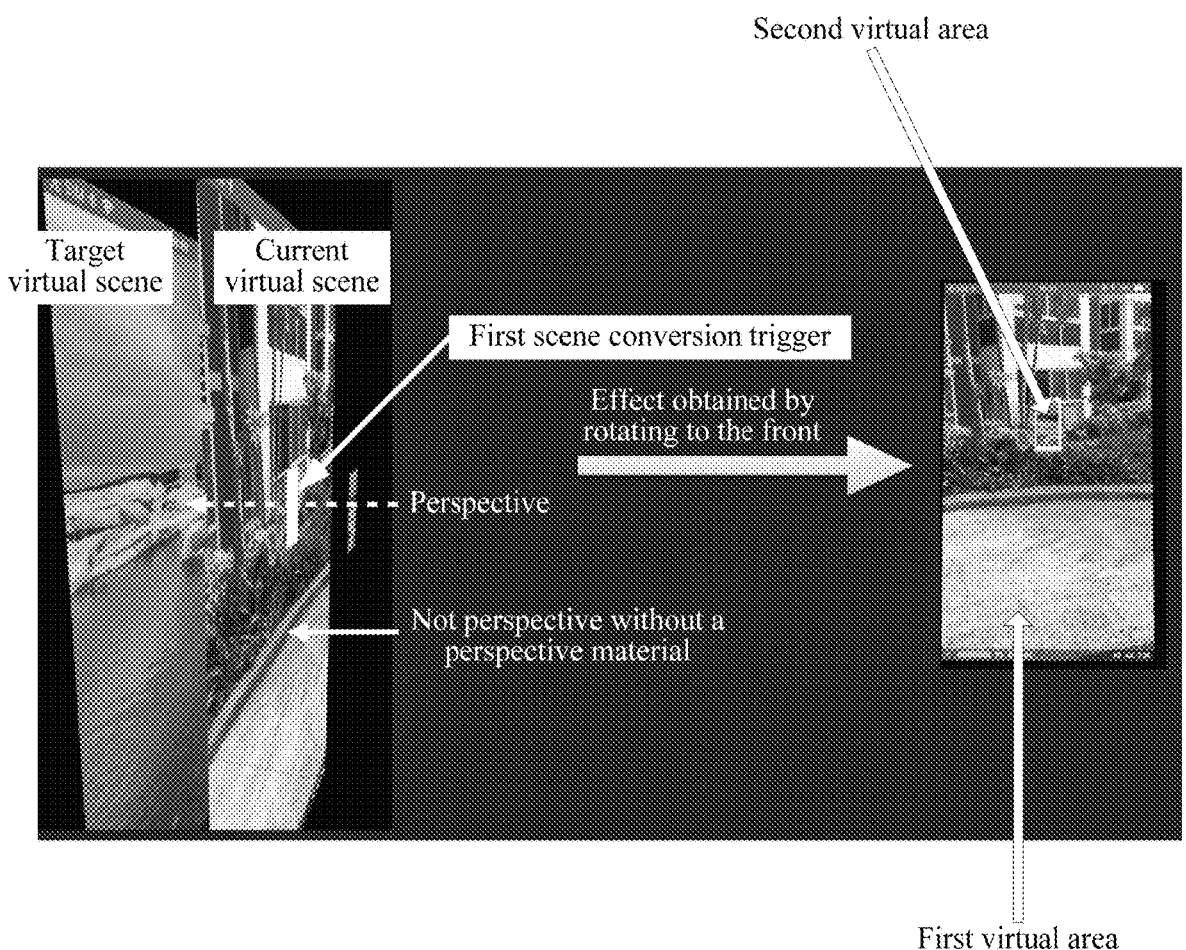
FIG. 8 is a schematic perspective view of two layers of virtual scenes according to an embodiment of this application.

Referring to FIG. 8, FIG. 8 is a perspective view of two layers of target virtual scenes (worlds). The first scene conversion trigger (a portal) is made of a perspective material. The perspective material may be understood as follows: for example, the first scene conversion trigger (the portal) is not rendered, but a next virtual scene is rendered.

Figure 9:
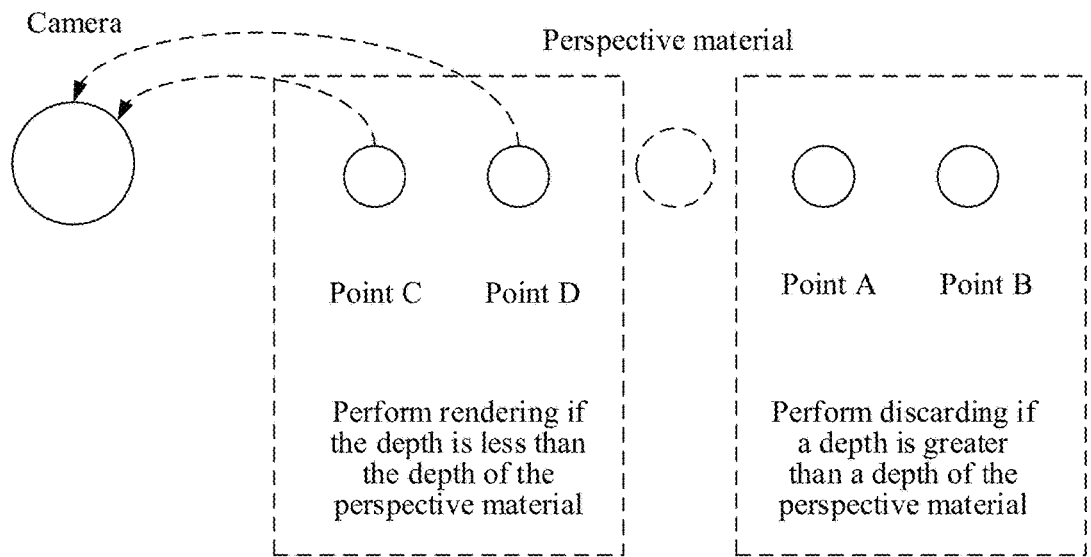
FIG. 9 is a schematic diagram of a perspective principle of a scene conversion trigger according to an embodiment of this application.

FIG. 9 is a diagram of a perspective principle of a scene conversion trigger according to an embodiment of this application. The terminal does not render points with a depth greater than a depth of the perspective material (that is, the points are background points relative to the first portal, that is, a point A and a point B in FIG. 9), and points with a depth less than the depth of the perspective material (that is, the points are foreground points relative to the first portal, that is, a point C and a point D in FIG. 9) are normally rendered in depth. In this way, a visual illusion is created. After line of sight penetrates through the first portal, all the objects (including the background) behind the portal are not rendered. Instead, a next virtual scene is rendered. The line of sight reaches the next virtual scene after directly penetrating through the initial virtual scene. This is similar to looking through transparent layers to reach a layer behind transparent layers.

Figure 10:
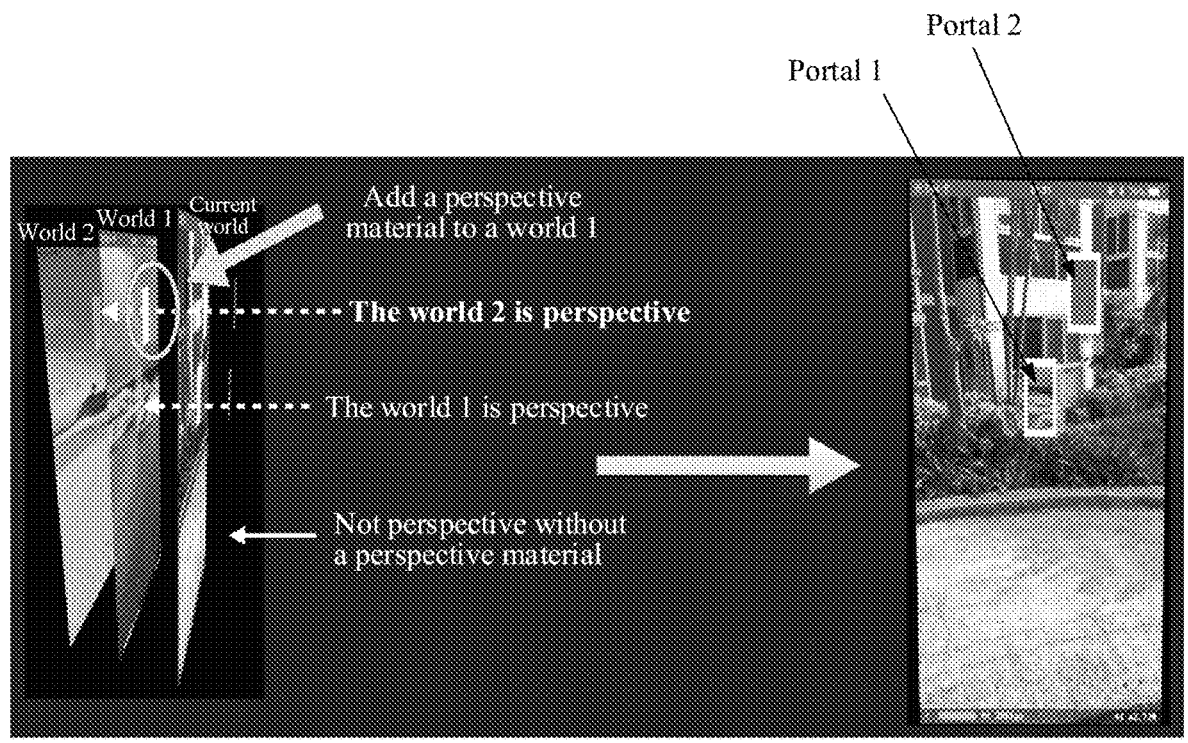
FIG. 10 is a schematic view of a perspective principle of three layers of virtual scenes according to an embodiment of this application.

Referring to FIG. 10, FIG. 10 is a schematic diagram of a perspective principle of three virtual scenes (worlds). A perspective material is added to an initial virtual scene (an initial world), and a perspective material is also added to a position corresponding to the initial world in a first target virtual scene (a world 1). It may be understood that partial information of a second target virtual scene (a world 2) is rendered at a position of a first scene conversion trigger (a portal 2), so that a user can directly see the world 2 through the portal 2. Partial information of the world 1 is rendered at a position of a first scene conversion trigger (a portal 1) corresponding to the initial virtual scene, so that a user can directly see the first target virtual scene (that is, the world 1) through the portal 1. The initial virtual scene is associated with the world 1 through the portal 1, and the initial virtual scene is associated with the world 2 through the portal 2. In this example, the scene conversion triggers are arranged in parallel, and target virtual scenes associated with different first scene conversion triggers can be seen through the first scene conversion triggers.

If a second scene conversion trigger is disposed at the perspective material position of the world 1, and partial information of the second target virtual scene (the world 2) is rendered at a position of the second scene conversion trigger, the user can see the partial information of the world 1 through the portal 1 in the initial world and the portal in the world 1, and can further see the partial information of the world 2 through the portal in the world 1.

In a possible implementation, referring to FIG. 3, the scene conversion triggers are arranged in series. The initial virtual scene corresponds to at least one first scene conversion trigger, and the first target virtual scene corresponds to at least one second scene conversion trigger. Partial information of the first target virtual scene is rendered at the position corresponding to the first scene conversion trigger according to an viewing angle and a position of a virtual object, the second scene conversion trigger corresponding to the first target virtual scene is rendered in the partial information of the first target virtual scene, and the partial information of the second target virtual scene is rendered at the position of the second scene conversion trigger corresponding to the first target virtual scene.

In this example, at least two target virtual scenes are displayed through the scene conversion triggers arranged in series, that is, the user can see a portal in the initial world and a first target virtual scene (for example, a forest scene) associated with the portal, and can further see, through the portal, another portal (not the portal in the initial world) and a first target virtual scene associated with the portal. It may be understood that there is a portal between the first target virtual scene (the world 1) and the second target virtual scene (the world 2) and between the second target virtual scene (the world 2) and a third target virtual scene (a world 3). In order to see the world 1 to the world 3, line of sight is caused to penetrate through the portal between the world 1 and the world 2 and then the portal between the world 2 and the world 3. By analogy, a plurality layers of worlds can be seen through a plurality of portals. In an intermediate world (for example, the world 2), portals with the same orientation are added at the same coordinate position. The initial world is perspective through the portal (including transparency of an interface carrying a two-dimensional planar world, such as view of an IOS system and layer of an Android system).

In another possible implementation, referring to FIG. 2, at least two first scene conversion triggers in the initial virtual scene are in the screen area. Partial information of one target virtual scene is rendered at a position of each first scene conversion trigger, the initial virtual scene being associated, through different first scene conversion triggers, with different target virtual scenes rendered at positions corresponding to the different first scene conversion triggers. The initial virtual scene, each first scene conversion trigger, and a target virtual scene rendered at a position corresponding to each first scene conversion trigger are displayed. It may be understood that, two parallel perspective first scene conversion triggers, such as a portal 1 and portal 2 are added to the initial virtual scene (which is also referred to as an initial world). At the portal 1, the initial virtual world is not rendered, but the partial information of the first target virtual scene (the world 1) is rendered, and the partial information of the second target virtual scene (that is, the world 2) is rendered at the portal 2. A range by which the first target virtual scene and the second target virtual scene are to be rendered and partial information of first target virtual scene and the second target virtual scene to be rendered vary according to a real-time angle of a camera and a position of a terminal.

In this example, at least two first scene conversion triggers are arranged in parallel. Each first scene conversion trigger in the initial virtual scene is associated with a different target virtual scene, and different target virtual scenes are displayed through the at least two first scene conversion triggers.

In this example, at least two scene conversion triggers are overlaid on a real scene image to obtain a hybrid virtual-real image. It may be understood that a plurality of portals and different target virtual scenes associated with each of the portals are displayed in the hybrid virtual-real image.

Step 506: Display a hybrid virtual-real image.

Referring to FIG. 2 and FIG. 3, the terminal displays the hybrid virtual-real image on the display screen. A user can see the at least two portals within in the real scene from the display screen. Each portal displays a different target virtual scene (that is, a different world).

In this embodiment of this application, the number of virtual scenes (which are also referred to as "worlds") displayed in the hybrid virtual-real image is not limited, two target virtual scenes are used as an example only. A specific number of target virtual scenes in actual applications is not limited herein.

The above embodiment is an exemplary description in an augmented reality scene. If the method is applied to virtual reality, the principle is the same as that of the above embodiment. In another possible embodiment, that is, in a virtual reality scene, different from the foregoing embodiment corresponding to FIG. 5, the terminal may not need to obtain a real scene image in the real scene.

The terminal obtains the real-time angle and real-time position information of the camera. The terminal then determines the first scene conversion trigger set in the initial virtual scene (the initial virtual scene is a virtual scene) according to the real-time angle and the real-time position information of the camera. The first scene conversion trigger set is used for displaying at least one target virtual scene. The terminal renders and displays the first scene conversion trigger set and the partial information of the target virtual scene at the position of the first scene conversion trigger scene according to the real-time angle and the real-time position information of the camera.

Based on the above embodiment, in a possible embodiment, the target virtual scene includes at least a first target virtual scene and a second target virtual scene, and the virtual scene set includes images corresponding to all angles and positions of all three-dimensional scenes. The screen area includes a first virtual area and a second virtual area. The first virtual area is used for displaying the initial virtual scene and the first scene conversion trigger set. The second virtual area is used for displaying at least one target virtual scene in the initial virtual scene. The step of displaying the initial virtual scene, the first scene conversion trigger set, and the partial information of at least one target virtual scene in the screen area may be further described as follows:

The terminal may determine a viewing angle and a position of a virtual object in the virtual scene according to the real-time angle and the real-time position information of the camera. Various images in the target virtual scene at various angles and distances may be pre-stored in the terminal. A first image and a first scene conversion trigger corresponding to the initial virtual scene at the viewing angle and the position of the virtual object are loaded in the first virtual area. A second image corresponding to the target virtual scene associated with the initial virtual scene at the viewing angle and the position of the virtual object are loaded in the second virtual area.

In this example, images are pre-built at various angles and positions of all virtual scenes. After the terminal determines the real-time angle and the real-time position of the camera, the terminal calculates the viewing angle and the position of the virtual object in the virtual scene, and then directly loads an image corresponding to the viewing angle and the position of the virtual object, improving the speed of rendering the virtual scene.

In a possible embodiment, how a user experiences travelling from a real scene to a virtual scene is described below.

If a trigger operation on the first scene conversion trigger is received, the target virtual scene and a second scene conversion trigger set are determined based on the first scene conversion trigger operation in the initial virtual scene. The determined target virtual scene and the second scene conversion trigger set are rendered, and the determined target virtual scene and a second scene conversion trigger set corresponding to the determined target virtual scene are displayed in the screen area.

1. In an application scenario in which the scene conversion triggers are arranged in series, it may be understood that in the initial world, there may be a plurality of portals, and the plurality of portals may be displayed in a form shown in FIG. 2 (that is, the portal 2 may be seen inside the portal 1). The portal 1 (the first scene conversion trigger) may be referred to as a portal in the initial world, and the portal 2 (the second scene conversion trigger) may be referred to as a portal in a non-initial world. The portal in the initial world can be directly seen in the initial world, and the portal in the non-initial world can only be seen through a portal connecting the initial world and the non-initial world.

Further, from a user's perspective, when a user travels from the real scene to the first target virtual scene:

the terminal detects a real-time angle of the camera and an initial position of the terminal, and calculates an viewing angle and a position of a virtual object in the initial virtual scene based on the real-time angle of the camera and the initial position of the terminal.

In a case that a position of the virtual object reaches a position of the first scene conversion trigger, determine the first scene conversion trigger in the initial virtual scene and the first target virtual scene associated with the initial virtual scene through the first scene conversion trigger. Determine a second scene conversion trigger set corresponding to the first target virtual scene. The first target virtual scene and the second scene conversion trigger set are rendered, and the first target virtual scene and the second scene conversion trigger set corresponding to the first target virtual scene are displayed in the screen area. The first target virtual scene becomes the initial virtual scene, and the second scene conversion trigger set becomes the first scene conversion trigger set in the initial virtual scene.

Specifically, the above may be understood as follows: when the position of the virtual object reaches the position of the first scene conversion trigger (the first portal), determine the first target virtual scene (for example, a land scene) associated with the first scene conversion trigger and the second scene conversion trigger set (an area corresponding to at least one portal in the land scene) in the first target virtual scene. The terminal determines to switch from the initial virtual scene (an augmented reality scene) to the first target virtual scene (for example, a land scene), that is, the terminal renders the first target virtual scene (for example, a land scene) and the second scene conversion trigger set in the screen display area. In this case, the first target virtual scene becomes the initial virtual scene, and the second scene conversion trigger set in the first target virtual scene becomes the first scene conversion trigger set.

Furthermore, for target virtual scene switching, in a case that the position of the virtual object reaches the position of a first scene conversion trigger in the initial virtual scene, the first scene conversion trigger in the initial virtual scene is triggered. It is determined, according to the first scene conversion trigger, to switch the initial virtual scene to a second target virtual scene associated with the first scene conversion trigger in the initial virtual scene and a second scene conversion trigger set associated with the second target virtual scene. The second target virtual scene and the second scene conversion trigger set associated with the second target virtual scene are rendered and displayed in the screen area. The second target virtual scene becomes the initial virtual scene, and the second scene conversion trigger set becomes the first scene conversion trigger set in the initial virtual scene.

In an application scenario in which the scene conversion triggers are arranged in series, the terminal successively renders the target virtual scenes according to an order (or layer) at which the scene conversion triggers are arranged in series. With reference to FIG. 8 and FIG. 10, two scene conversion triggers adjacent in spatial order are associated with a same target virtual scene, and every two adjacent scene conversion triggers are arranged in series.

For example, the initial virtual scene is associated with the first target virtual scene through the scene conversion trigger #1, the first target virtual scene is associated with the second target virtual scene through the scene conversion trigger #2, and the second target virtual scene is associated with the third target virtual scene through the scene conversion trigger #3. Both the scene conversion trigger #1 and the scene conversion trigger #2 are associated with the first target virtual scene, and both the scene conversion trigger #2 and scene conversion trigger #3 are associated with the second target virtual scene. The scene conversion trigger #1, the scene conversion trigger #2, and the scene conversion trigger #3 are arranged in series, and so on. In an application scenario in which the scene conversion triggers are arranged in series, a user needs to successively travel through the target virtual scenes according to the order at which the target virtual scenes are displayed.

In this example, the terminal switches from the initial virtual scene (an augmented reality scene) to the first target virtual scene (for example, a forest scene), and then performs switching from the first target virtual scene (for example, a forest scene) to display the second target virtual scene (for example, a land scene). From the perspective of the user, the user travels from the real scene to the forest scene, and then travels from the forest scene to the land scene.

Figure 11:
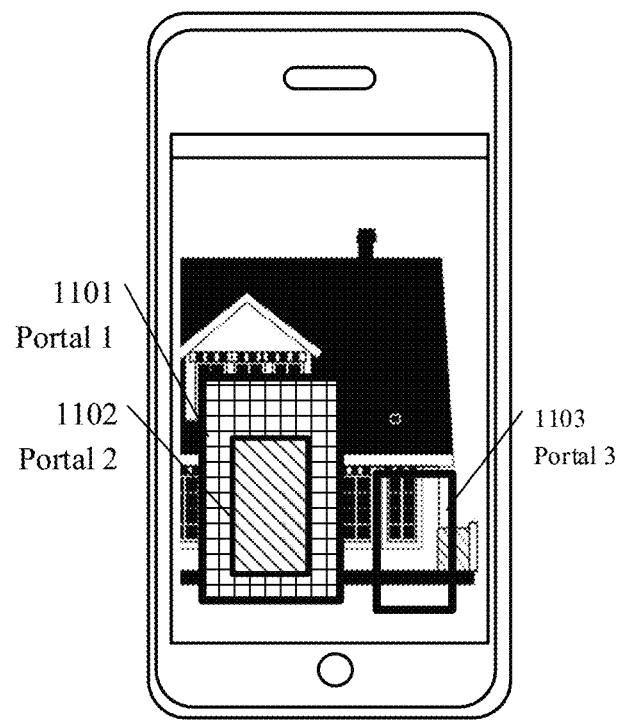
FIG. 11 is a schematic diagram of another application scenario according to an embodiment of this application.

In the serial arrangement of the scene conversion triggers, in another embodiment, the initial virtual scene is associated with at least two first scene conversion triggers. One of the at least two first scene conversion triggers is a virtual-real scene conversion trigger, and the virtual-real scene conversion trigger is configured to perform switching between a virtual scene and a real scene. With reference to FIG. 11, the first scene conversion trigger 1101 (for example, the portal 1) displays the first target virtual scene and the second scene conversion trigger 1102 (for example, the portal 2) corresponding to the target virtual scene, and the first scene conversion trigger 1103 is a virtual-real scene conversion trigger (for example, the portal 3). In this example, when the initial virtual scene is an augmented reality scene, the virtual reality scene conversion trigger 1103 does not render the target virtual scene. The portal 1 and the portal 2 are configured to render the virtual scene, and the portal 3 renders real scene and does not render the virtual scene.

The terminal obtains the second real scene image in the real scene according to the real-time angle and the real-time position of the camera. The terminal overlays the second real scene image onto the virtual-real scene conversion trigger. In this example, the virtual-real scene conversion trigger is configured to be associated with the real scene, and a user can see the real scene in the initial virtual scene.

Furthermore, when the terminal detects that the virtual object reaches the position of the virtual-real scene conversion trigger (for example, the portal 3), a third real scene image in the real scene is collected according to the real-time angle and the real-time position of the camera. The initial virtual scene is switched to the real scene, and the terminal displays the third real scene image. In this exemplary application scenario, in FIG. 11, the user can see the portal 1 in the forest scene. The portal 1 displays a land scene. Through the portal 1, the portal 2 in the portal 1 can be seen. The portal 2 displays a desert scene. The portal 3 can also be seen. The portal 3 displays the real scene. The user holding the mobile phone moves toward the position of the portal 3. When the virtual object reaches the position of the portal 3, the mobile phone displays a real scene image in the real scene, and the user feels like travelling from the virtual scene to the real scene.

2. In an application scenario in which the scene conversion triggers are arranged in parallel:

the displaying an initial virtual scene, a first scene conversion trigger set, and partial information of at least one target virtual scene in a screen area specifically includes:

displaying at least two first scene conversion triggers in the initial virtual scene in the screen area; rendering partial information of one target virtual scene at a position of each first scene conversion trigger, the initial virtual scene being associated, through different first scene conversion triggers, with different target virtual scenes rendered at positions corresponding to the different first scene conversion triggers; and displaying the initial virtual scene, each first scene conversion trigger, and a target virtual scene rendered at a position corresponding to each first scene conversion trigger.

Figure 12:
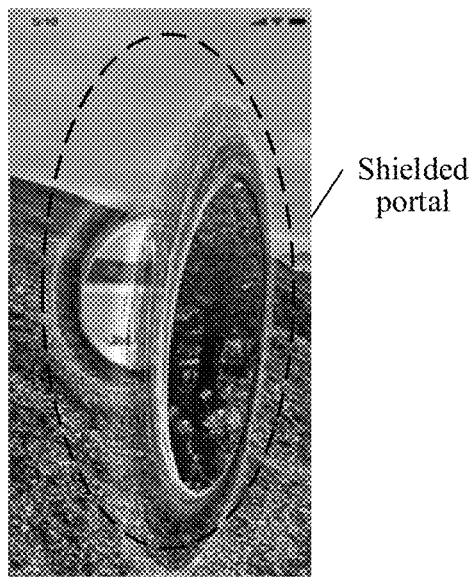
FIG. 12 is a schematic diagram of a scene conversion trigger with an occlusion relationship according to an embodiment of this application.

A plurality of first scene conversion triggers are triggered at different positions in the initial virtual scene. The initial virtual scene may be an augmented reality scene. Different target virtual scenes are rendered in the areas corresponding to each respective first scene conversion trigger. The real scene is associated, through each target scene conversion trigger, with the target virtual scene rendered in the area corresponding to each target scene conversion trigger, and each target virtual scene belongs to a virtual scene set. Optionally, with reference to FIG. 12, FIG. 12 is a schematic diagram of a scene conversion trigger with a shielding relationship. If the initial world includes a plurality of scene conversion triggers (portals), the portals have a shielding relationship, and the shielding relationship depends on positions of the portals in respective initial virtual scenes.

If it is determined that a specified first scene conversion trigger in the initial virtual scene is triggered, the target virtual scene and the second scene conversion trigger corresponding to the target virtual scene are determined based on the specified first scene conversion trigger in the initial virtual scene.

In a possible implementation, when the position of the virtual object reaches a position of any one of the at least two first scene conversion triggers, the target virtual scene and the second scene conversion trigger associated with the target virtual scene are determined based on the initial virtual scene and the specified first scene conversion trigger. In an application scenario, the real scene image includes at least two portals: a portal 1 and a portal 2. The real scene is associated with the first target virtual scene (for example, a forest scene) through the portal 1, and is associated with the second virtual scene (for example, a land scene) through the portal 2. When the virtual object reaches the portal 1, the terminal renders the forest scene. When the virtual object reaches the portal 2, the terminal renders the forest scene. For example, when the virtual object reaches the portal 1, the terminal renders the forest scene, that is, the user feels like travelling to the forest scene. In the forest scene, the user can also see a plurality of portals. Each portal is associated with a different target virtual scene. In this example, the terminal determines target virtual scenes according to different first scene conversion triggers (different parallel portals), and switches from the initial virtual scene to a target scene corresponding to the triggered first scene conversion trigger. From a user's perspective, a user does not need to successively travel through the scenes, and can directly travel from the initial virtual scene to a target virtual scene associated with the specified first scene conversion trigger.

Figure 13:
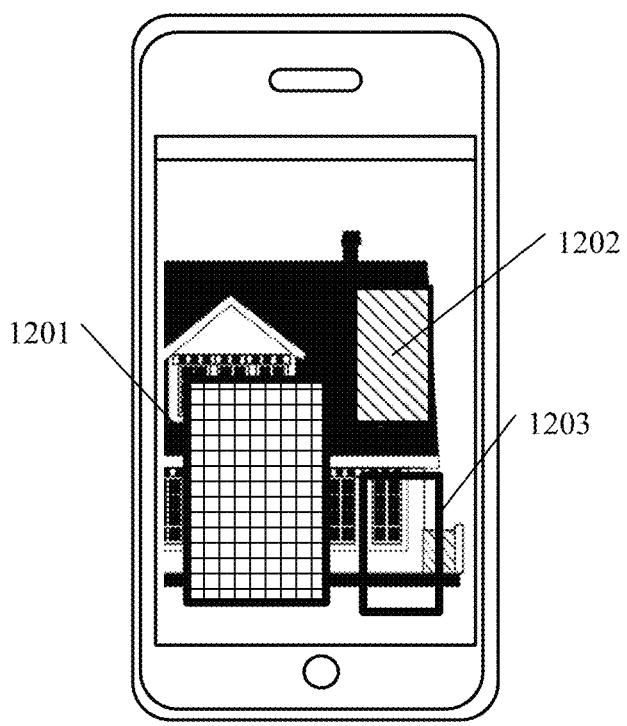
FIG. 13 is a schematic diagram of another application scenario according to an embodiment of this application.

In another embodiment, with reference to FIG. 13, the terminal displays three first scene conversion triggers in the screen area. One of the first scene conversion triggers is a virtual-real scene conversion trigger. The first target virtual scene is displayed in the area corresponding to the first scene conversion trigger 1201 (for example, the portal 1), and the second target virtual scene is displayed in the area corresponding to the first scene conversion trigger 1202 (for example, the portal 2). The virtual-real scene conversion trigger 1203 (the portal 3) is configured to associate with the real scene, and the user can see the real scene in the initial virtual scene.

Further, when the terminal detects that the virtual object reaches the position of the virtual-real scene conversion trigger, for example, the first scene conversion trigger 1203 (the portal 3), a third real scene image in the real scene is collected according to the real-time angle and the real-time position of the camera. The initial virtual scene is switched to the real scene, and the terminal displays the third real scene image.

In this exemplary application scenario, for example, the user in a forest scene can see the portal 1 and the portal 2. The portal 1 and the portal 2 are arranged in parallel, so that a land scene can be seen through the portal 1 and a desert scene can be seen through the portal 2. The portal 3 can also be seen. The portal 3 displays the real scene. The user moves toward the position of the portal 3 with the mobile phone. When the virtual object reaches the position of the portal 3, the mobile phone displays the real scene image in the real scene, and the user feels like travelling from the initial virtual scene to the real scene.

It may be understood that the scene conversion trigger (for example, the portal) connects two virtual scenes (that is, virtual worlds): a source world and a destination world. Scenery of the source world is displayed outside the portal area, and scenery of the destination world is displayed inside the portal area. The portal is displayed in the source world for observing the destination world. Therefore, the concept of the first scene conversion trigger set corresponding to the initial virtual scene is all first scene conversion triggers (all portals) in the initial world (or source world), and the concept of a second scene conversion trigger set in one virtual scene (world) is all scene conversion triggers (portals) of the world corresponding to this particular scene if considering the world as a source world.

In this embodiment of this application, different virtual scenes are rendered in the same coordinate system. Substances in all worlds are independent. Substances in an initial world may be directly observed, and substances in other worlds need to be observed through one or more corresponding portals. This is because all of the worlds share the same coordinate system. Therefore, different worlds in the same space may have respective independent substances, and rendering of substances in different worlds does not affect each other.

In the same world, whether rigid bodies of different substances affect each other or not depends on requirements of an augmented reality service. Rigid body properties of different substances in different worlds may or may not affect each other. A rigid body refers to a property that neither the shape and the size nor relative positions of internal points of the body change when in motion or after a force is applied. In a virtual world, in a virtual scene, assuming there are two objects, such as two cars. If the two cars do not have a rigid body property, when positions of the two cars overlap, the two cars do not affect each other. If the two objects have a rigid body property, when the coordinates of the two objects overlap, the two objects collide. In this embodiment of this application, whether substances in different scenes have a rigid body property may be set or adjusted according to different services. For example, in a military training service, different substances may have a rigid body property, but in a game service, different substances may have no rigid body property.

Figure 14:
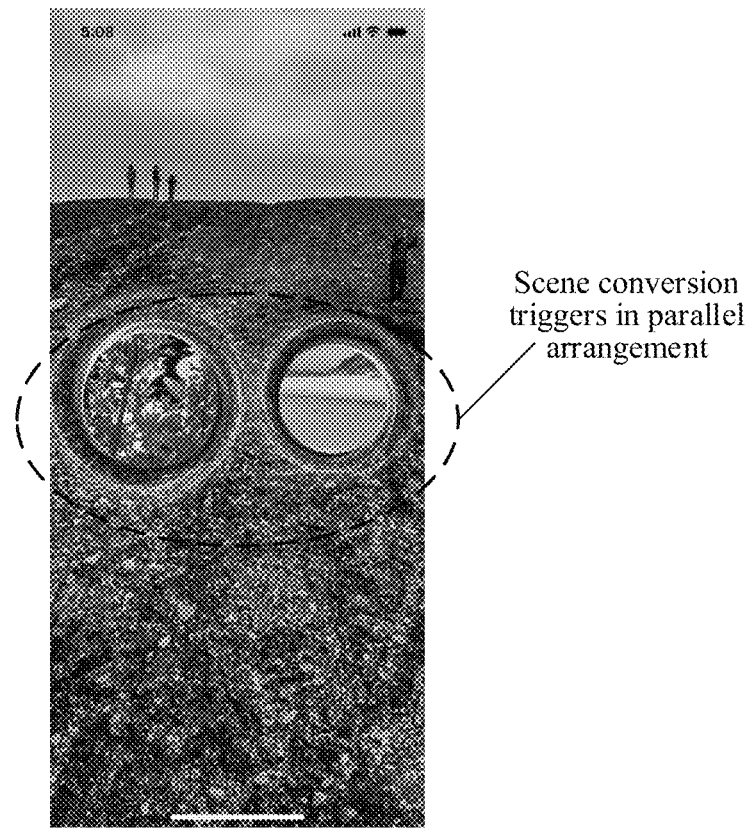
FIG. 14 is a schematic diagram of another application scenario of a scene conversion trigger according to an embodiment of this application.
Figure 15:
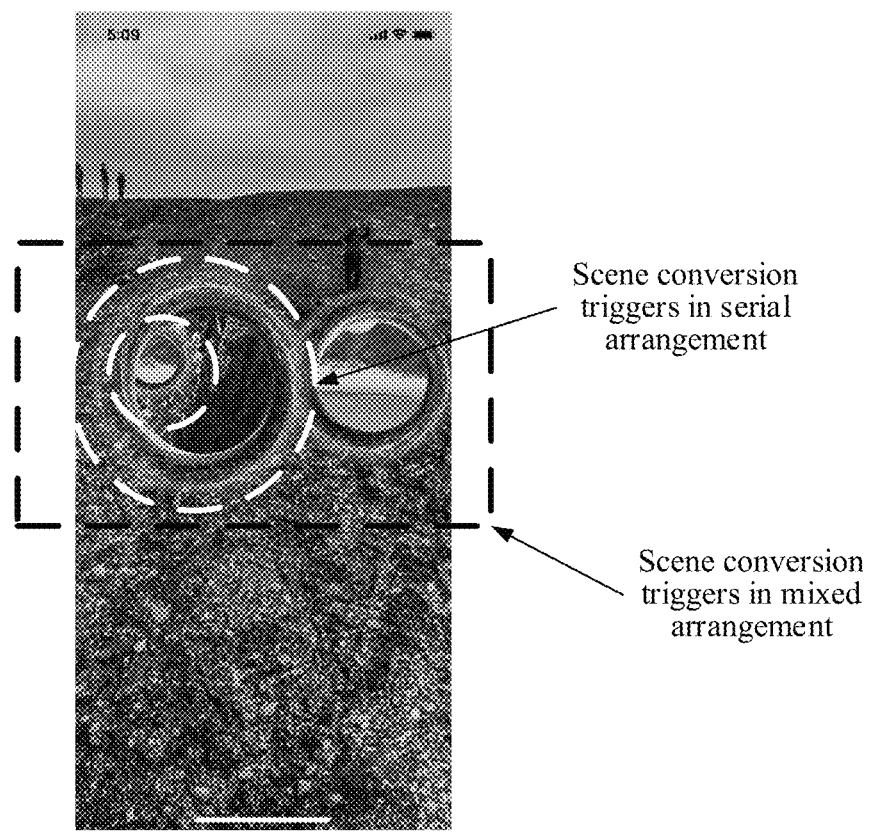
FIG. 15 is a schematic diagram of another application scenario of a scene conversion trigger according to an embodiment of this application.

Referring to FIG. 14 and FIG. 15. FIG. 14 includes scene conversion triggers in parallel arrangement (parallel portals). In the initial virtual scene, a first target virtual scene can be seen through one of the scene conversion triggers, and another target virtual scene can be seen through another scene conversion trigger. FIG. 15 shows scene conversion triggers in mixed arrangement. From the first target virtual scene, the second target virtual scene can be seen through a corresponding portal. In order to see the third target virtual scene from the first target virtual scene through a corresponding portal, same-oriented portals are placed at the same positions in the first target virtual scene and the second target virtual scene, so that line of sight penetrates through the portal corresponding to the first target virtual scene to see the second target virtual scene, and then penetrates through the portal corresponding to the second target virtual scene to see the third target virtual scene, and so on. There is no limitation on how many layers of virtual scenes may be penetrated through. In addition, a $Y^{th}$ layer of target virtual scene can be seen through another parallel portal. Y is less than or equal to N, and N is the total number of layers of virtual scenes.

Figure 16:
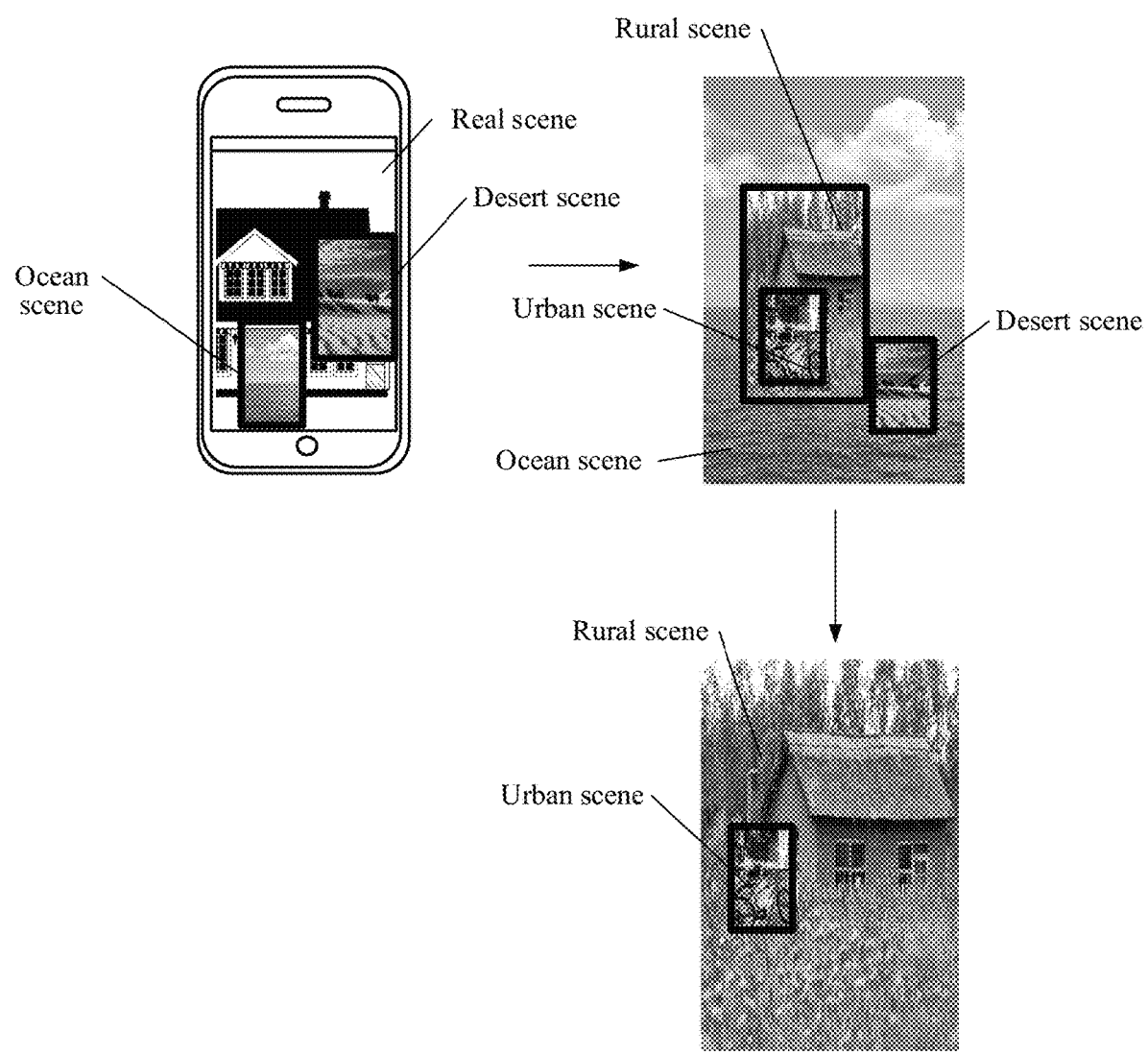
FIG. 16 is a schematic diagram of another application scenario according to an embodiment of this application.

Referring to FIG. 16 for understanding, FIG. 16 is a schematic diagram of an application scenario according to an embodiment of this application. This scenario is applied to a tourism service. The first layer target virtual scene in the virtual scene set is an ocean scene, the second layer target virtual scene is a rural scene, the third layer target virtual scene is an urban scene, and the fourth layer target virtual scene is a desert scene.

A real scene is displayed on a user's mobile phone. Two virtual portals are displayed in the real scene. An ocean scene is displayed inside a portal A, and the ocean scene may be the first layer target virtual scene in the virtual scene set. A desert scene is displayed inside another virtual portal B, and the desert scene may be the fourth layer scene in the virtual scene set. In other words, a perspective substance is disposed on the second target virtual scene and the third target virtual scene, and user's line of sight can directly see the fourth layer target virtual scene (the desert scene) through the portal B.

The real scene is associated with the ocean scene through portal A, and the real scene is associated with the desert scene through portal B.

When the user holding the mobile phone moves, a virtual object in the virtual scene moves accordingly. When a position of the virtual object reaches the portal A, the terminal renders the ocean scene, so that the user visually feels like travelling from the real scene to the ocean scene and being in the ocean scene.

In the ocean scene, the user can see the rural scene through a portal C, the urban scene through a portal D in the portal C, and the desert scene through a portal E. In the ocean scene, coordinates of the portal C and the portal E are fixed, that is, positions are fixed. In other words, when an angle of a camera is changed, a viewing angle of the virtual object in the ocean scene changes accordingly, and scenery in the ocean scene changes. In some viewing angles, the portal C and the portal D do not appear in the line of sight. When the user rotates the camera to cause the viewing angle of the virtual object change, the portal C and the portal D may return to the line of sight of the user.

Likewise, when the user holding the mobile phone moves, a virtual object in the virtual scene moves accordingly. When a position of the virtual object reaches the portal C, the terminal renders the rural scene, so that the user visually feels like travelling from the real scene to the rural scene and being immersed in the rural scene. The virtual scene may further include a portal F. The portal F is associated with the real scene. When the virtual object reaches a position of the portal F, the terminal displays a real scene image according to a real-time angle and a real-time position of the camera. The terminal displays the real scene image, so that the user feels like travelling from the virtual scene to the real scene.

Figure 17:
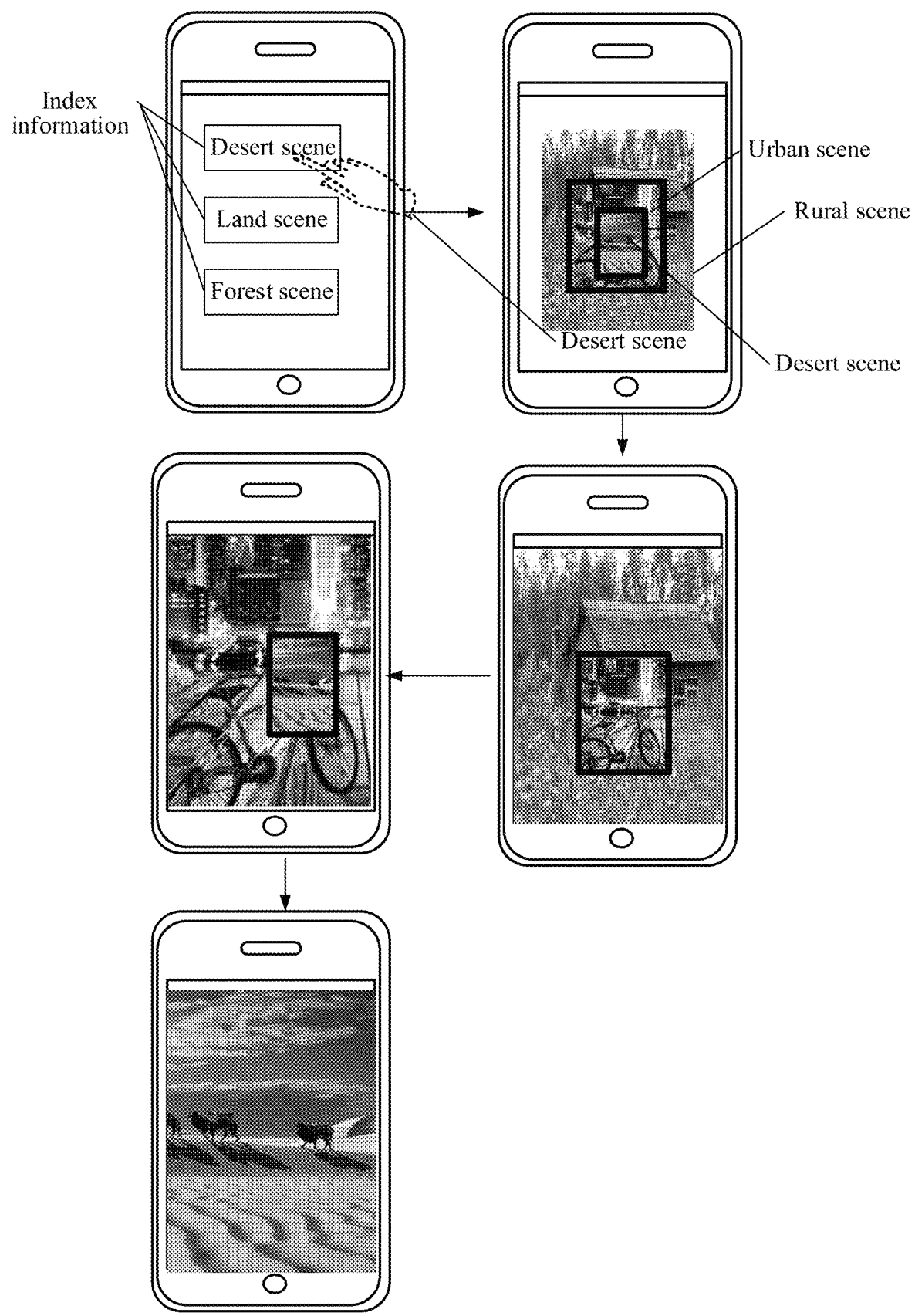
FIG. 17 is a schematic diagram of another application scenario according to an embodiment of this application.

In another possible embodiment, referring to FIG. 17, the screen display area further displays index information of a plurality of target virtual scenes. The index information includes but is not limited to text introduction information of the target virtual scenes (such as text display "urban scene" and "desert scene"), picture information, or virtual scene information (direct display of the target virtual scene through the portal).

The terminal displays the index information of the plurality of target virtual scenes:

The user performs selection according to the index information. For example, the user views a text description of a desert and selects the desert scene, and the terminal receives an inputted selection operation for selecting the target virtual scene. The selection operation may be a tap operation performed by a user, or a voice command, etc. There is no limitation on the manner of selection operation.

The terminal may determine a path for rendering the target virtual scene according to the selection operation of the user, and successively render X virtual scenes according to the selection operation, X being a natural number, until the target virtual scene is rendered.

The path may be understood as virtual scenes that need to be successively rendered to eventually render the target virtual scene. That is, a number of virtual scenes need to be rendered before the final target virtual scene may be rendered. For example, if the target virtual scene selected by the user is a desert scene, the desert scene is the third layer target virtual scene, the first layer target virtual scene is the rural scene, and the second layer target virtual scene is the urban scene, the path is as follows: the rural scene is rendered first, and then the urban scene is rendered. After these two virtual scenes are rendered, the selected target virtual scene (the desert scene) is to be rendered.

The path may be displayed in a form of serial areas (serial portals), that is, a portal 1 displays the forest scene, through the portal 1, a portal 2 can be seen, through the portal 2, the land scene and a portal 3 can be seen, and the portal 3 displays the desert scene.

Figure 18:
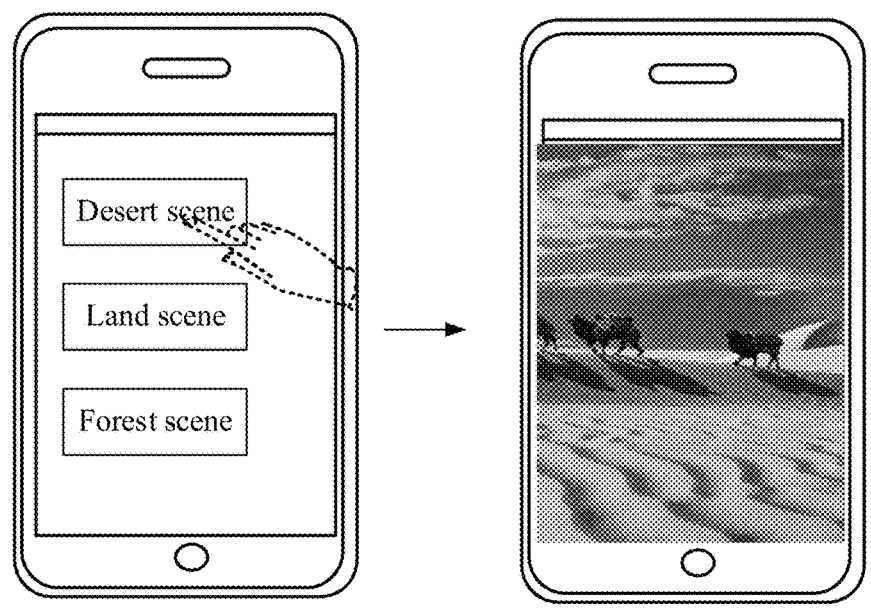
FIG. 18 is a schematic diagram of another application scenario according to an embodiment of this application.

In another possible implementation, with reference to FIG. 18, the terminal may select the target virtual scene through a selection operation, and the terminal may directly render the selected target virtual scene (the desert scene) according to the selection operation.

In this example, the terminal may display the index information. The index information is used for providing an index for a user to select the virtual scene. The user may perform a selection operation according to the index information, and may directly render the target virtual scene selected by the user, or may render the selected target virtual scene through the path, so that the user visually feels like directly travelling to the selected target virtual scene, increases use scenarios of different services.

Figure 19:
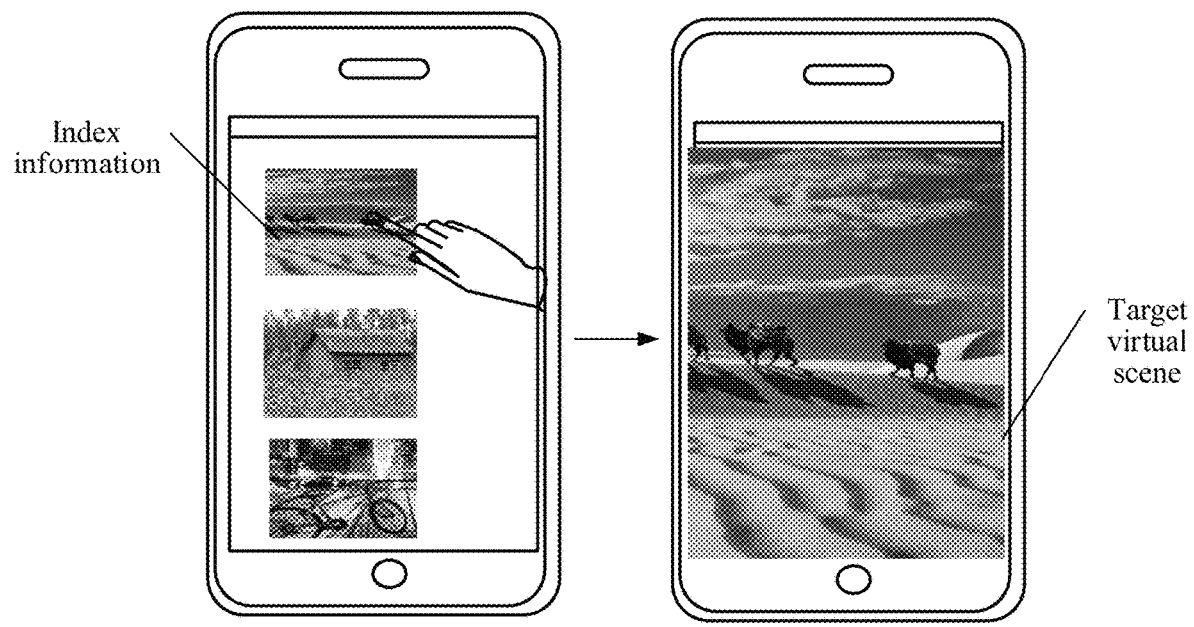
FIG. 19 is a schematic diagram of another application scenario according to an embodiment of this application.

With reference to FIG. 19, the index information is a thumbnail of the target virtual scene. The thumbnail is used for displaying the target virtual scene more intuitively. The user may perform a selection operation according to the index information, and may directly render the scene selected by the user, or may render the selected target virtual scene through the path, so that the user visually feels like directly travelling to the selected target virtual scene, increases use scenarios of different services.

In another embodiment, a method for implementing virtual scene conversion in an embodiment of this application may be applied to a system. The system may include a terminal and a server. A difference between this embodiment and the embodiment corresponding to FIG. 5 is that the server performs of dimensionality reduction on a three-dimensional scene.

The terminal collects a real-world image in a real scene through a camera.

The server performs dimensionality reduction on a plurality of three-dimensional scenes to obtain a two-dimensional planar scene corresponding to each of the plurality of three-dimensional scenes, and overlay the plurality of three-dimensional scenes by overlaying a plurality of two-dimensional planar scenes.

The server sends a virtual scene set to the terminal.

The terminal receives the virtual scene set, and determines a first scene conversion trigger set in an initial virtual scene according to a real-time angle and real-time position information of the camera. The first scene conversion trigger is used for displaying partial information of the target virtual scene.

The terminal determines a position of a first scene conversion trigger set in the initial virtual scene according to the real-time angle and the real-time position information of the camera.

The terminal displays the initial virtual scene, the first scene conversion trigger set, and the partial information of at least one target virtual scene in a screen area.

In this embodiment of this application, the terminal collects a real-world image in a real scene through the camera. The server performs dimensionality reduction on a plurality of three-dimensional scenes to obtain a two-dimensional planar scene corresponding to each of the plurality of three-dimensional scenes, and overlay the plurality of three-dimensional scenes by overlaying a plurality of two-dimensional planar scenes. In this example, the server performs dimensionality reduction on the three-dimensional scene to save processing resources of the terminal and improve the overall efficiency. The terminal determines the first scene conversion trigger set in the initial virtual scene according to the real-time angle and the real-time position information of the camera. For example, the virtual scene may be a forest scene or a desert scene, etc. At a first scene conversion trigger, various forms such as a portal, a gate, or a black hole may be rendered according to different application scenarios. There is no limitation on how the trigger is rendered. The terminal renders, according to the real-time angle and the real-time position information of the camera, the partial information of at least one target virtual scene in an area corresponding to the first scene conversion trigger. Then the terminal displays a hybrid virtual-real image through a display screen. In this embodiment of this application, dimensionality reduction is performed on each of the plurality of three-dimensional scenes to obtain a corresponding two-dimensional planar scene, and then the plurality of two-dimensional planar scenes are overlaid to overlay a plurality of virtual scenes. During rendering of the virtual scenes, the terminal may render and display the plurality of three-dimensional scenes in the virtual scene set to improve adaptability of different virtual reality/augmented reality services and increase application scenarios of virtual reality/augmented reality.

Figure 20:
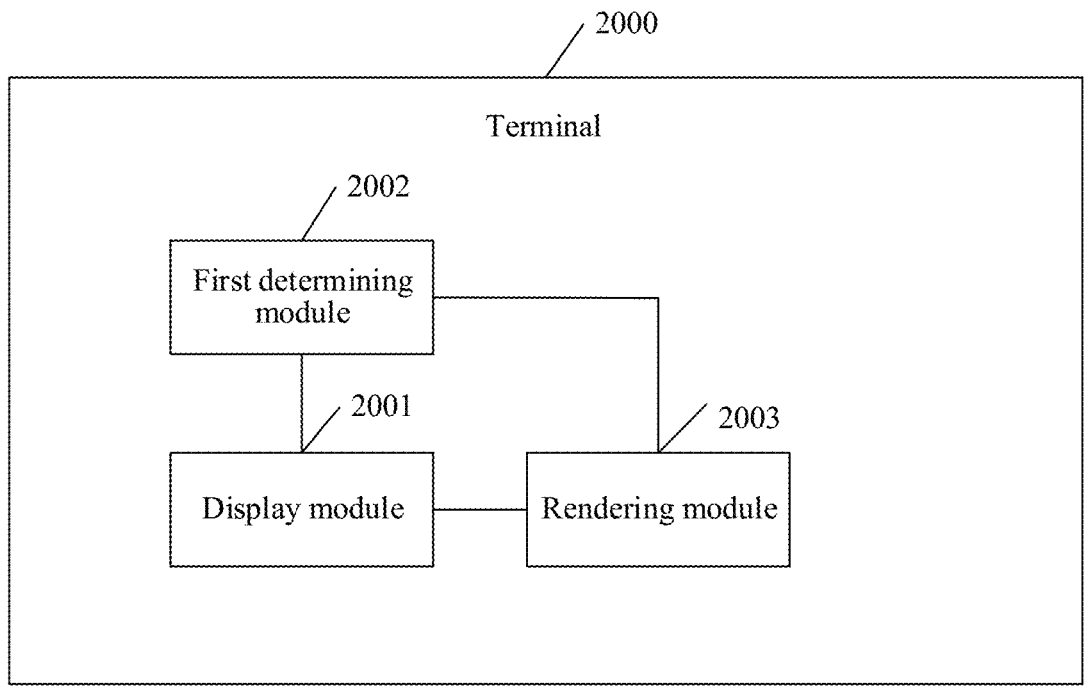
FIG. 20 is a schematic structural diagram of an embodiment of an apparatus for implementing virtual scene conversion according to an embodiment of this application.

Referring to FIG. 20, an embodiment of this application provides an apparatus for implementing virtual scene conversion. The terminal is configured to perform steps actually performed by the terminal in the foregoing method embodiments. The apparatus 2000 includes:

a display module 2001 configured to display an initial virtual scene, a first scene conversion trigger set, and partial information of at least one target virtual scene in a screen area, a scene conversion trigger being used for implementing conversion between associated different virtual scenes, and the first scene conversion trigger set including at least one first scene conversion trigger associated with the initial virtual scene;

a first determining module 2002 configured to determine, in a case that a trigger operation on the first scene conversion trigger is received, the target virtual scene and a second scene conversion trigger set based on the trigger operation, the second scene conversion trigger set including at least one second scene conversion trigger associated with a plurality of determined target virtual scenes; and a rendering module 2003 configured to render the determined target virtual scene and the second scene conversion trigger set determined by the first determining module 2002.

The display module 2001 is further configured to display, in the screen area, the target virtual scene and the second scene conversion trigger set determined by the rendering module 2003.

In this embodiment of this application, the initial virtual scene and the first scene conversion trigger set for triggering scene conversion are displayed on the screen area of the terminal, the first scene conversion trigger set including at least one first scene conversion trigger associated with the initial virtual scene. If the initial virtual scene is a virtual reality scene, the first scene conversion trigger set includes at least one first scene conversion trigger. If the initial virtual scene is an augmented reality scene, the first scene conversion trigger set includes at least two first scene conversion triggers. If one of the first scene conversion triggers is triggered, the terminal switches the virtual scene from the initial virtual scene to the target virtual scene associated with the first scene conversion trigger, and the target virtual scene and the second scene conversion trigger set in the target virtual scene are displayed on the screen area. In this case, the target virtual scene becomes the initial virtual scene, and correspondingly, the second scene conversion trigger set in the target virtual scene becomes the first scene conversion trigger set. In the embodiments of this application, conversion between a plurality of virtual scenes can be implemented, so that a user visually feels to travel amongst a plurality of virtual scenes, improving adaptability of different augmented reality/virtual reality/mixed reality services and increase application scenarios of augmented reality/virtual reality/mixed reality.

In a possible implementation, the virtual scene may be an augmented reality scene, a virtual reality scene, or a mixed reality scene.

Figure 21:
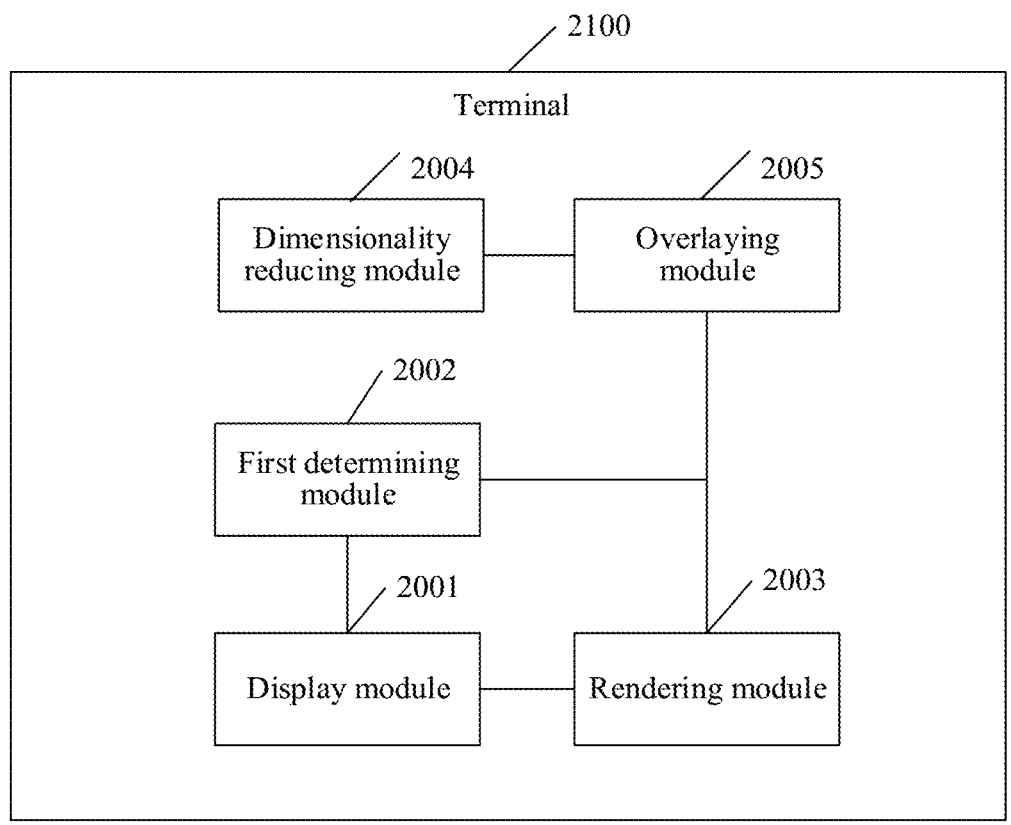
FIG. 21 is a schematic structural diagram of another embodiment of an apparatus for implementing virtual scene conversion according to an embodiment of this application.

Based on FIG. 20, referring to FIG. 21, an embodiment of this application further provides another embodiment of the apparatus. The target virtual scene belongs to a virtual scene set, and a plurality of virtual scenes in the virtual scene set are three-dimensional scenes. The apparatus 2100 further includes a dimensionality reducing module 2004 and an overlaying module 2005.

The dimensionality reducing module 2004 is configured to perform dimensionality reduction on all of the three-dimensional scenes to obtain two-dimensional planar scenes corresponding to all of the three-dimensional scenes.

The overlaying module 2005 is configured to overlay the two-dimensional planar scenes respectively corresponding to all of the three-dimensional scenes so that different virtual scenes are associated through a scene conversion trigger.

In this embodiment of this application, dimensionality reduction on the three-dimensional scene is an intermediate process of rendering of the virtual scene, so as to overlay the plurality of three-dimensional scenes and associate the plurality of virtual scenes through the scene conversion trigger. During dimensionality reduction, a plurality of scenes may be overlaid in sequence, and a scene conversion trigger is disposed in each scene. An area corresponding to the scene conversion trigger is made of a perspective material, so that displaying of partial information of a next scene can be triggered through the scene conversion trigger.

Figure 22:
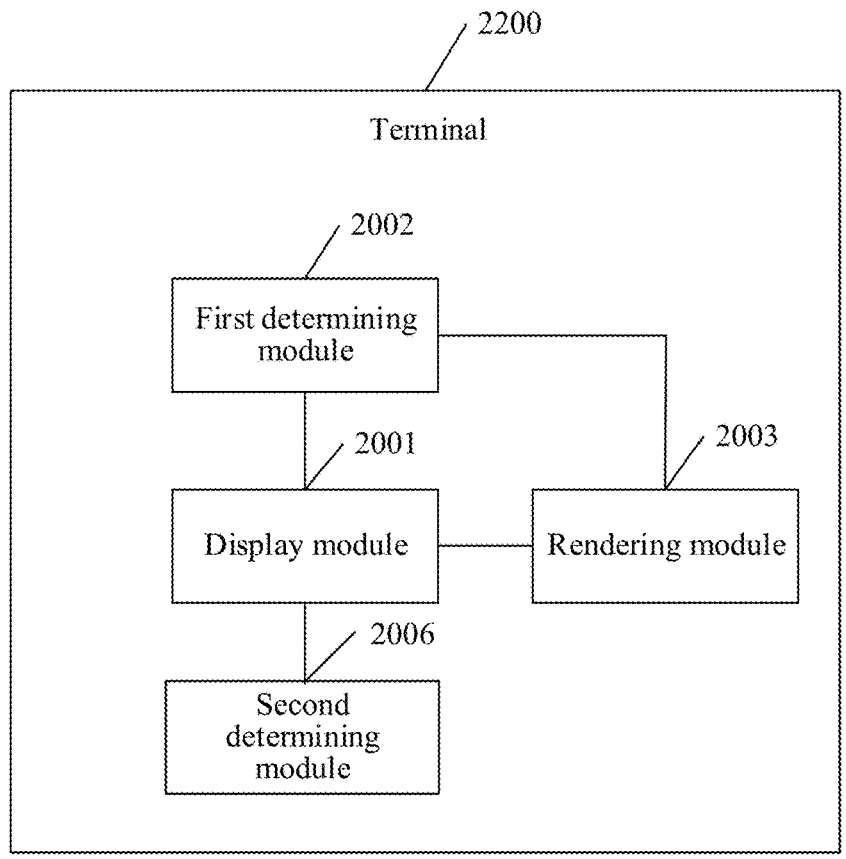
FIG. 22 is a schematic structural diagram of an embodiment of an apparatus for implementing virtual scene conversion according to an embodiment of this application.

Based on FIG. 20, referring to FIG. 22, an embodiment of this application further provides another embodiment of the apparatus. The screen area includes a first virtual area and a second virtual area. The first virtual area is used for displaying the initial virtual scene and the first scene conversion trigger set, the second virtual area is used for displaying the partial information of at least one target virtual scene in a current virtual scene, and the first virtual area and the second virtual area constitute the entire screen area. The apparatus 2200 further includes a second determining module 2006.

The second determining module 2006 is configured to determine a viewing angle and a position of a virtual object in the initial virtual scene.

The display module 2001 is further configured to: load, in the first virtual area, a first image and a first scene conversion trigger set corresponding to the initial virtual scene at the viewing angle and the position of the virtual object determined by the second determining module 2006; and load, in the second virtual area, a second image corresponding to the target virtual scene associated with the initial virtual scene at the viewing angle and the position of the virtual object.

In this example, images are pre-built at various angles and positions of all virtual scenes. After the terminal determines the real-time angle and the real-time position of the camera, the terminal calculates the viewing angle of the virtual object and the position of the virtual object in the virtual scene, and then directly loads an image corresponding to the viewing angle of the virtual object and the position of the virtual object, improving the speed of rendering the virtual scene.

Figure 23:
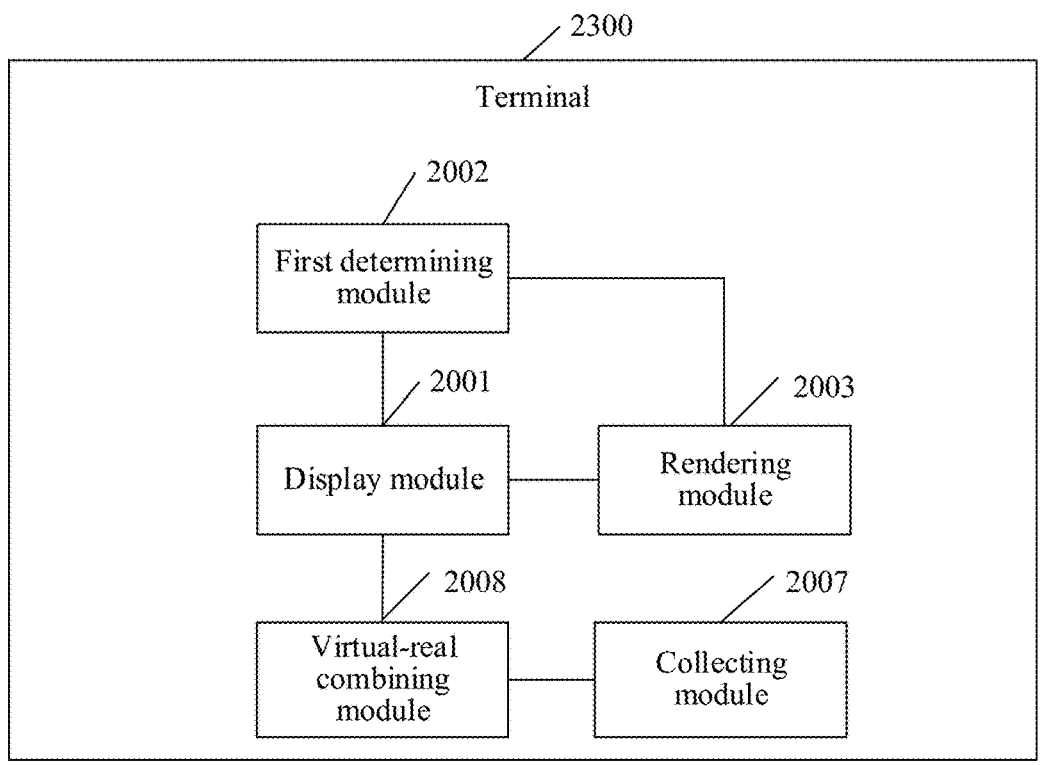
FIG. 23 is a schematic structural diagram of an embodiment of an apparatus for implementing virtual scene conversion according to an embodiment of this application.

Based on FIG. 20, referring to FIG. 23, an embodiment of this application further provides another embodiment of the apparatus. The initial virtual scene includes a real scene, and the apparatus 2300 further includes a collecting module 2007 and a virtual-real combining module 2008.

The collecting module 2007 is configured to collect a first real scene image in the real scene through a camera.

The virtual-real combining module 2008 is configured to overlay at least two first scene conversion triggers and partial information of at least two target virtual scenes onto the first real scene image collected by the collecting module 2007, to obtain a hybrid virtual-real image.

The display module 2001 is further configured to display the hybrid virtual-real image processed by the virtual-real combining module 2008.

This embodiment of this application is used for an augmented reality scene. The initial virtual scene includes a real scene, and the initial virtual scene includes a hybrid virtual-real image.

In a possible embodiment, the initial virtual scene is associated with at least two first scene conversion triggers, one of the at least two first scene conversion triggers being a virtual-real scene conversion trigger used for switching between a virtual scene and a real scene.

The collecting module 2007 is configured to collect a second real scene image in the real scene through a camera.

The virtual-real combining module 2008 is configured to overlay, at a position of the virtual-real scene conversion trigger, the second real scene image collected by the collecting module 2007.

In another possible embodiment, the collecting module 2007 is further configured to: when determining the virtual-real scene conversion trigger in the initial virtual scene is triggered, collect a third real scene image in the real scene according to a real-time angle and a real-time position of the camera.

The display module 2001 is configured to display the third real scene image of the real scene.

In this embodiment of this application, the virtual-real scene conversion trigger is to be associated with the real scene. When the virtual-real scene conversion trigger is triggered, the terminal switches the initial virtual scene to the real scene.

In another possible embodiment, two scene conversion triggers adjacent in spatial order are associated with a same target virtual scene, and every two scene conversion triggers adjacent in spatial order are arranged in series.

In another possible embodiment, the first determining module 2002 is further configured to: in a case that a position of a virtual object reaches a position of the first scene conversion trigger, determine to trigger the first scene conversion trigger in the initial virtual scene and trigger, through the first scene conversion trigger, the first target virtual scene associated with the initial virtual scene.

In a case that the determined target virtual scene is a first target virtual scene, the rendering module 2003 is further configured to render a first target virtual scene and the second scene conversion trigger set associated with the first target virtual scene.

The display module 2001 is further configured to display the first target virtual scene and the second scene conversion trigger set associated with the first target virtual scene in the screen area, and use the first target virtual scene as the initial virtual scene and the second scene conversion trigger set associated with the first target virtual scene as the first scene conversion trigger set in the initial virtual scene.

In another possible embodiment, the first determining module 2002 is further configured to: in a case that the position of the virtual object reaches the position of the first scene conversion trigger in the initial virtual scene, determine to trigger the first scene conversion trigger in the initial virtual scene; and determine, according to the first scene conversion trigger, to switch the initial virtual scene to a second target virtual scene associated with the first scene conversion trigger in the initial virtual scene and a second scene conversion trigger associated with the second target virtual scene.

The rendering module 2003 is further configured to render and display, in the screen area, the second target virtual scene and the second scene conversion trigger set associated with the second target virtual scene; and use the second target virtual scene as the initial virtual scene and the second scene conversion trigger set associated with the second target virtual scene as the first scene conversion trigger set in the initial virtual scene.

In another possible embodiment, the initial virtual scene includes at least two first scene conversion triggers arranged in parallel.

The display module 2001 is further configured to display the at least two first scene conversion triggers in the initial virtual scene in the screen area.

The rendering module 2003 is further configured to render partial information of one target virtual scene at a position of each first scene conversion trigger displayed by the display module 2001, the initial virtual scene being associated, through different first scene conversion triggers, with different target virtual scenes rendered at positions corresponding to the different first scene conversion triggers.

The display module 2001 is further configured to display the initial virtual scene, each first scene conversion trigger, and a target virtual scene rendered at position corresponding to each first scene conversion triggers.

In another possible embodiment, the first determining module 2002 is further configured to: determine, in a case that a position of a virtual object reaches a position of any one of the at least two first scene conversion triggers, the target virtual scene and the second scene conversion trigger set associated with the target virtual scene based on the initial virtual scene and the particular first scene conversion trigger.

In another possible embodiment, the rendering module 2003 is further configured to render a plurality of different target virtual scenes in the same coordinate system, the target virtual scenes belonging to a virtual scene set. In this embodiment of this application, different target virtual scenes are rendered in the same coordinate system. Substances in all worlds are independent. Substances in an initial world may be directly observed, and substances in other worlds need to be observed through one or more corresponding portals. This is because all of the worlds share the same coordinate system. Therefore, different worlds in the same space may have respective independent substances, and rendering of substances in different worlds does not affect each other.

Figure 24:
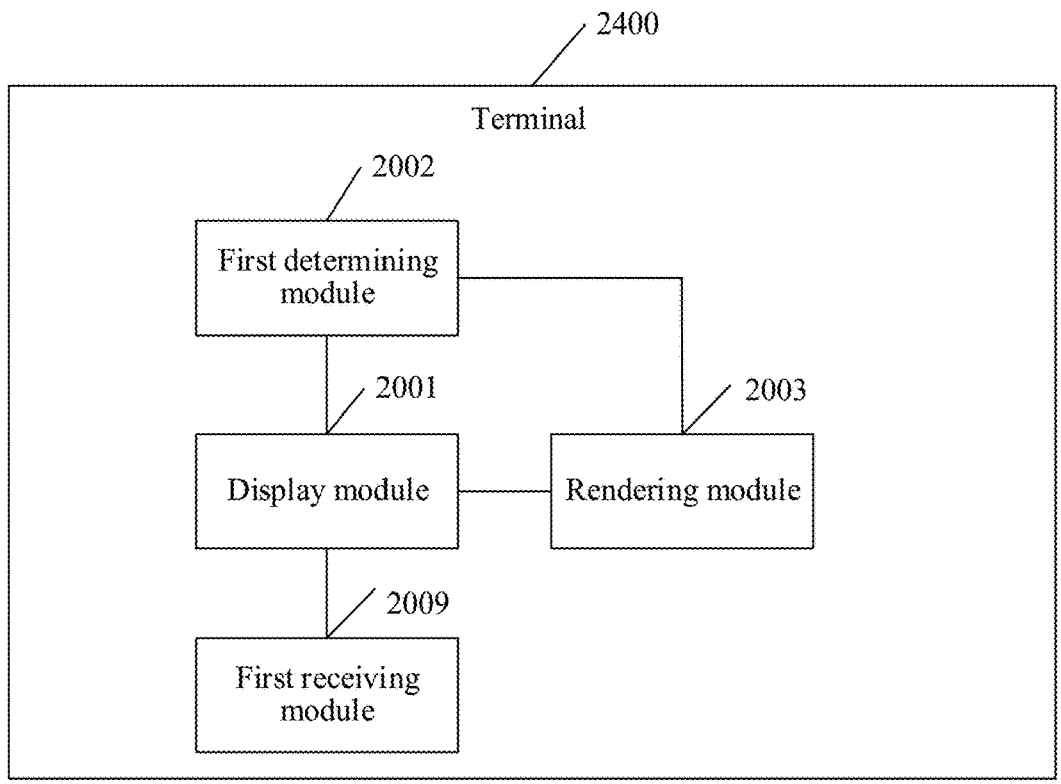
FIG. 24 is a schematic structural diagram of an embodiment of an apparatus for implementing virtual scene conversion according to an embodiment of this application.

Based on FIG. 20, referring to FIG. 24, an embodiment of this application further provides another embodiment of the apparatus. The partial information of the target virtual scene further includes index information of a plurality of target virtual scenes, and the apparatus 2400 further includes a first receiving module 2009.

The display module 2001 is further configured to display the index information of the plurality of target virtual scenes.

The first receiving module 2009 is configured to receive a selection operation for selecting a target virtual scene inputted by using the target index information displayed by the display module 2001.

The rendering module 2003 is configured to render a selected target virtual scene according to the selection operation received by the receiving module 2009.

In another possible embodiment, in a case that there are X virtual scenes between the initial virtual scene and the selected target virtual scene in the virtual scene set, X being a natural number, the apparatus further includes a path determining module. The path determining module is configured to determine, according to the selection operation, a path for rendering the selected target virtual scene, the path including the X virtual scenes.

The rendering module 2003 is further configured to successively render the X virtual scenes according to the selection operation until the selected target virtual scene is rendered.

In this example, the terminal may display the index information, the index information being used for providing an index for a user to select a virtual scene. The user may perform a selection operation according to the index information. The terminal may directly render a scene selected by the user, or render the target virtual scene through a path, so that the user visually feels like directly travelling to the selected target virtual scene, increasing use scenarios of different services.

Figure 25:
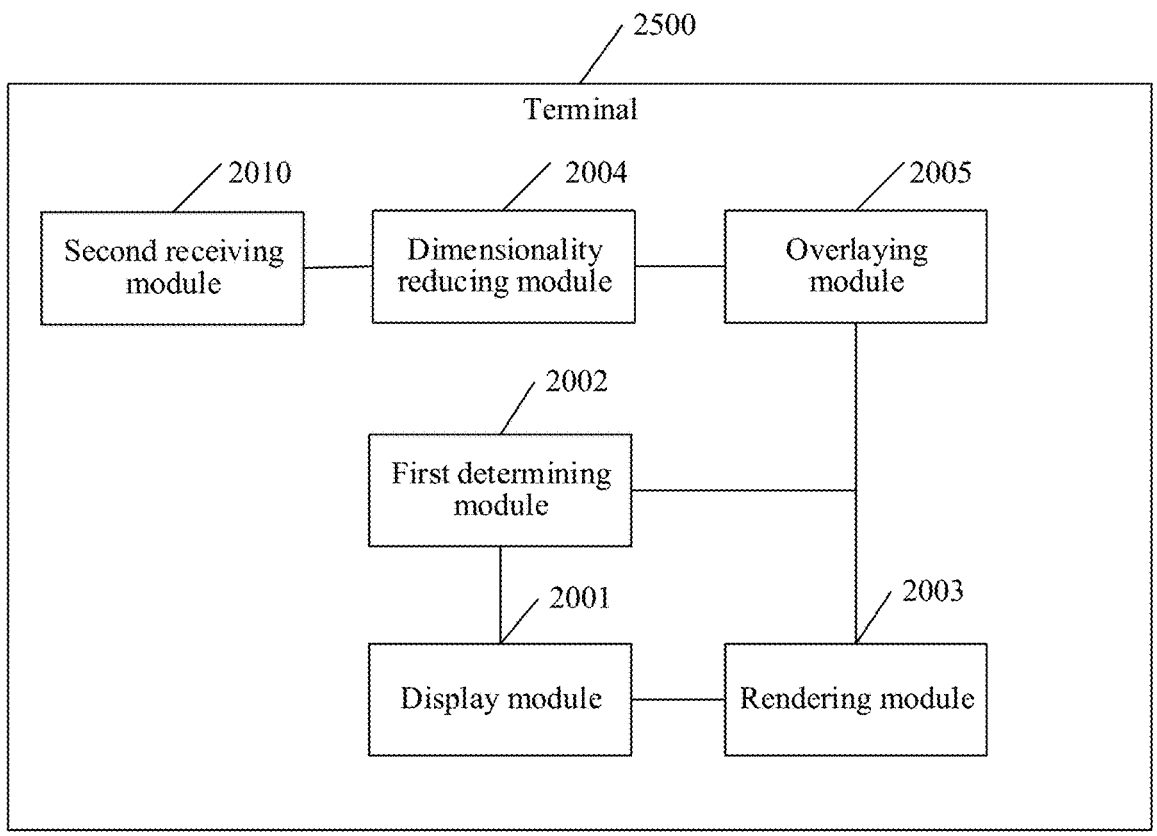
FIG. 25 is a schematic structural diagram of an embodiment of an apparatus for implementing virtual scene conversion according to an embodiment of this application.

Based on FIG. 21, referring to FIG. 25, another embodiment of the apparatus is provided. The apparatus further includes a second receiving module 2010.

The second receiving module 2010 is configured to receive the virtual scene set transmitted by a server.

Figure 26:
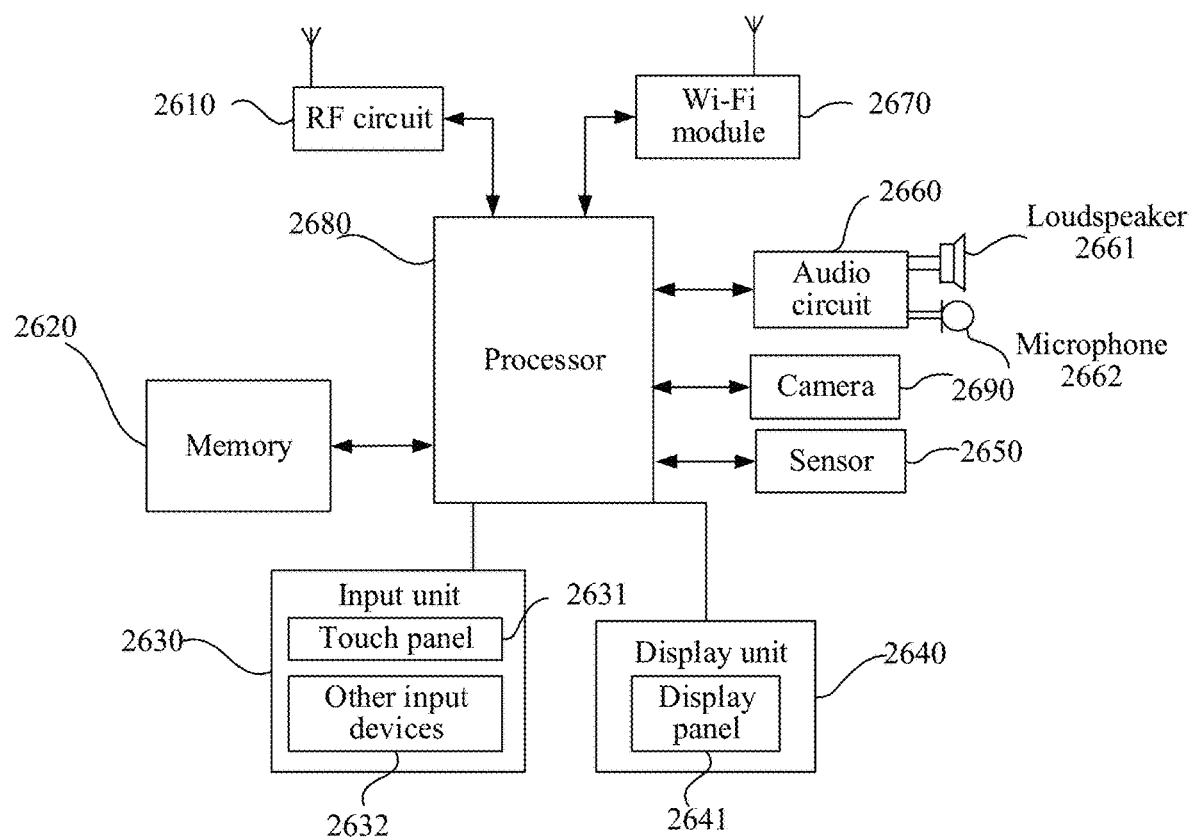
FIG. 26 is a schematic structural diagram of an embodiment of an apparatus for implementing virtual scene conversion according to an embodiment of this application.

Referring to FIG. 26, an embodiment of this application further provides another terminal. As shown in FIG. 26, for ease of description, only parts related to this embodiment of this application are shown. For specific technical details not disclosed, refer to the method parts of the embodiments of this application. The terminal may be a terminal device such as a mobile phone, a tablet computer, a personal digital assistant (PDA), VR glasses, and a VR helmet, etc. For example, the terminal is a mobile phone.

FIG. 26 is a block diagram of a part of a structure of the mobile phone related to the terminal according to this embodiment of this application. Referring to FIG. 26, the mobile phone includes components such as a radio frequency (RF) circuit 2610, a memory 2620, an input unit 2630, a display unit 2640, a sensor 2650, an audio circuit 2660, a wireless fidelity (WiFi) module 2670, a processor 2680, a camera 2690, etc. A person skilled in the art may understand that the mobile phone structure shown in FIG. 26 constitutes no limitation on the mobile phone, and the mobile phone may include more or fewer components than those shown in the figure, or a combination of some components, or different component layouts.

The components of the mobile phone are described in detail below with reference to FIG. 26.

The RF circuit 2610 may be configured to receive and send a signal during an information receiving and sending process or a call process, and in particular, after downlink information of a base station is received, send the downlink information to the processor 2680 for processing. In addition, The RF circuit sends uplink data to the base station. Generally, the RF circuit 2610 includes but is not limited to an antenna, at least one amplifier, a transceiver, a coupler, a low noise amplifier (LNA), a duplexer, etc. In addition, the RF circuit 2610 may further communicate with a network and another device through wireless communication. The wireless communication may use any communications standard or protocol, including but not limited to the global system of mobile communication (GSM), the general packet radio service (GPRS), code division multiple access (CDMA), wideband code division multiple access (WCDMA), Long Term Evolution (LTE), email, short messaging service (SMS), etc.

The memory 2620 may be configured to store a software program and a module, and the processor 2680 executes various function applications of the mobile phone and performs data processing by running the software program and the module that are stored in the memory 2620. The memory 2620 may mainly include a program storage area and a data storage area. The program storage area may store an operating system, an application program required for at least one function (such as an audio playing function and an image playing function, etc.) etc. The data storage area may store data (such as audio data and a phone book, etc.) created according to use of the mobile phone. In addition, the memory 2620 may include a high speed random access memory, and may further include a non-volatile memory, such as at least one magnetic disk memory device, a flash memory device, or other non-volatile solid state memory devices.

The input unit 2630 may be configured to receive an entered numeral or character information, and generate key signal input related to user setting and function control of the mobile phone. Specifically, the input unit 2630 may include a touch panel 2631 and other input devices 2632. The touch panel 2631, also referred to as a touchscreen, may collect a touch operation performed by the user on or near the touch panel (such as an operation performed by a user on the touch panel 2631 or near the touch panel 2631 by using any proper object or accessory, such as a finger or a stylus), and drive a corresponding connecting apparatus according to a preset program. Optionally, the touch panel 2631 may include two parts: a touch detection apparatus and a touch controller. The touch detection apparatus detects a touch direction of a user, detects a signal generated by a touch operation, and transmits the signal to the touch controller. The touch controller receives touch information from the touch detection apparatus, converts the touch information into touch coordinates, and transmits the touch coordinates to the processor 2680; and may receive and execute a command transmitted by the processor 2680. In addition, the touch panel 2631 may be implemented in various types such as a resistor, a capacitor, an infrared ray, or a surface acoustic wave. The input unit 2630 may include other input devices 2632 in addition to the touch panel 2631. Specifically, the other input devices 2632 may include but are not limited to one or more of a physical keyboard, a function key (such as a volume control key or a power on/off key), a trackball, a mouse, a joystick, etc.

The display unit 2640 may be configured to display information inputted by a user or information provided to a user and various menus of the mobile phone. The display unit 2640 may include a display panel 2641. Optionally, the display panel 2641 may be configured in a form such as a liquid crystal display (LCD), an organic light-emitting diode (OLED), etc. Further, the touch panel 2631 may cover the display panel 2641. After detecting a touch operation on or near the touch panel, the touch panel 2631 transfers the operation to the processor 2680 to determine a touch event type. Then the processor 2680 provides corresponding visual output on the display panel 2641 according to the touch event type. In FIG. 26, the touch panel 2631 and the display panel 2641 are two independent components configured to implement input and input functions of the mobile phone. However, in some embodiments, the touch panel 2631 and the display panel 2641 may be integrated to implement the input and output functions of the mobile phone.

The mobile phone may further include at least one sensor 2650, for example, a light sensor, a motion sensor, and other sensors. Specifically, the light sensor may include an ambient light sensor and a proximity sensor. The ambient light sensor may adjust luminance of the display panel 2641 according to brightness of ambient light, and the proximity sensor may turn off the display panel 2641 and/or backlight when the mobile phone moves to an ear. As a motion sensor, an accelerometer sensor may detect accelerations in all directions (generally three axes), and may detect a magnitude and a direction of gravity when the accelerometer is at rest, and may be configured to recognize mobile phone posture applications (such as landscape and portrait switch, relevant games and magnetometer posture calibration), and vibration recognition related functions (such as a pedometer and knocking), etc. Details about other sensors such as gyroscopes, barometers, hygrometers, thermometers, and infrared sensors that may be further configured on the mobile phone are not repeated herein.

The audio circuit 2660, a loudspeaker 2661, and a microphone 2662 may provide audio interfaces between a user and the mobile phone. The audio circuit 2660 may transmit, to the loudspeaker 2661, an electrical signal obtained by converting received audio data, and the loudspeaker 2661 converts the electrical signal into a voice signal for outputting. In addition, the microphone 2662 converts a collected sound signal into an electrical signal. After receiving the electrical signal, the audio circuit 2660 converts the electrical signal into audio data, and then outputs the audio data. After processed by the processor 2680, the audio data is transmitted through the RF circuit 2610 to, for example, another mobile phone or the audio data is outputted to the memory 2620 for further processing.

WiFi belongs to near field communication. The mobile phone may help a user transmit and receive an email, browse a webpage, access streaming media, etc. through a WiFi module 2670. The WiFi module provides the user with wireless broadband Internet access. Although FIG. 26 shows the WiFi module 2670, it may be understood that the WiFi module is not an essential component of the mobile phone, and may be completely omitted according to requirements without changing the scope of the essence of the present disclosure.

As a control center of the mobile phone, the processor 2680 is connected to all parts of the entire mobile phone by using various interfaces and lines, and performs various functions and data processing of the mobile phone by running or executing the software program and/or module stored in the memory 2620 and invoking the data stored in the memory 2620, so as to perform overall monitoring on the mobile phone. Optionally, the processor 2680 may include one or more processing units. Exemplarily, an application processor and a modem processor may be integrated into the processor 2680. The application processor mainly processes an operating system, a user interface, an application program, etc. The modem processor mainly processes wireless communications. It may be understood that the modem processor may also not be integrated into the processor 2680.

The mobile phone includes a camera 2690 configured to collect images in the initial scene. In the embodiments of this application, the processor 2680 included in the terminal further has the following function:

The processor is configured to enable the terminal to perform the method actually performed by the terminal in the foregoing method embodiments.

Specifically, the processor 2680 is configured to cause the terminal to perform the following steps:

displaying an initial virtual scene, a first scene conversion trigger set, and partial information of at least one target virtual scene in a screen area, a scene conversion trigger being used for implementing conversion between associated different virtual scenes, and the first scene conversion trigger set including at least one first scene conversion trigger associated with the initial virtual scene; determining, in a case that a trigger operation on the first scene conversion trigger is received, the target virtual scene and a second scene conversion trigger set based on the trigger operation, the second scene conversion trigger set including at least one second scene conversion trigger associated with the determined target virtual scene; and rendering the determined target virtual scene and second scene conversion trigger set, and displaying the determined target virtual scene and second scene conversion trigger set in the screen area.

Optionally, the virtual scene is an augmented reality scene, a virtual reality scene, or a mixed reality scene.

Optionally, the target virtual scene belongs to a virtual scene set, a plurality of virtual scenes in the virtual scene set are three-dimensional scenes, and before the displaying an initial virtual scene, a first scene conversion trigger set, and partial information of at least one target virtual scene in a screen area, the method further includes:

performing dimensionality reduction on all of the three-dimensional scenes to obtain two-dimensional planar scenes corresponding to all of the three-dimensional scenes; and overlaying each of the two-dimensional planar scenes corresponding to the three-dimensional scene respectively, so that different virtual scenes are associated through a scene conversion trigger.

Optionally, the screen area includes a first virtual area and a second virtual area. The first virtual area is used for displaying the initial virtual scene and the first scene conversion trigger set, the second virtual area is used for displaying the partial information of the target virtual scene in a current virtual scene, and the first virtual area and the second virtual area constitute the entire screen area. The displaying an initial virtual scene, a first scene conversion trigger set, and partial information of at least one target virtual scene in a screen area includes:

determining an viewing angle and a position of a virtual object in the initial virtual scene;

loading, in the first virtual area, a first image and a first scene conversion trigger set corresponding to the initial virtual scene at the viewing angle and the position of the virtual object; and loading, in the second virtual area, a second image corresponding to the target virtual scene associated with the initial virtual scene at the viewing angle and the position of the virtual object.

Optionally, the method further includes:

collecting, in a case that the initial virtual scene includes a real scene, a first real scene image in the real scene through a camera;

overlaying at least two first scene conversion triggers and partial information of at least two target virtual scenes onto the first real scene image to obtain a hybrid virtual-real image; and displaying the hybrid virtual-real image.

The initial virtual scene is associated with at least two first scene conversion triggers, one of the at least two first scene conversion triggers being a virtual-real scene conversion trigger used for switching between a virtual scene and a real scene. The method further includes:

collecting a second real scene image in the real scene through a camera; and overlaying the second real scene image at a position of the virtual-real scene conversion trigger.

Optionally, the method further includes:

when determining the virtual-real scene conversion trigger in the initial virtual scene is triggered, collecting a third real scene image in the real scene according to a real-time angle and a real-time position of the camera; and displaying the third real scene image in the real scene.

Optionally, two scene conversion triggers adjacent in spatial order are associated with a same target virtual scene, and every two scene conversion triggers adjacent in spatial order are arranged in series.

Optionally, that a trigger operation on the first scene conversion trigger is received includes:

in a case that a position of a virtual object reaches a position of the first scene conversion trigger, determining to trigger the first scene conversion trigger in the initial virtual scene.

Optionally, in a case that the determined target virtual scene is a first target virtual scene, the rendering the determined target virtual scene and second scene conversion trigger set, and displaying the determined target virtual scene and second scene conversion trigger set in the screen area includes:

rendering the first target virtual scene and a second scene conversion trigger set associated with the first target virtual scene, displaying the first target virtual scene and the second scene conversion trigger set associated with the first target virtual scene in the screen area, and using the first target virtual scene as the initial virtual scene and the second scene conversion trigger set associated with the first target virtual scene as the first scene conversion trigger set in the initial virtual scene.

Optionally, the method further includes:

in a case that the position of the virtual object reaches the position of the first scene conversion trigger in the initial virtual scene, determining to trigger the first scene conversion trigger in the initial virtual scene;

determining, according to the first scene conversion trigger, to switch the initial virtual scene to a second target virtual scene associated with the first scene conversion trigger in the initial virtual scene and a second scene conversion trigger associated with the second target virtual scene;

rendering and displaying, in the screen area, the second target virtual scene and the second scene conversion trigger set associated with the second target virtual scene; and using the second target virtual scene as the initial virtual scene and the second scene conversion trigger set associated with the second target virtual scene as the first scene conversion trigger set in the initial virtual scene.

Optionally, the initial virtual scene includes at least two first scene conversion triggers arranged in parallel.

The displaying an initial virtual scene, a first scene conversion trigger set, and partial information of at least one target virtual scene in a screen area includes:

displaying at least two first scene conversion triggers in the initial virtual scene in the screen area;

rendering partial information of one target virtual scene at a position of each first scene conversion trigger, the initial virtual scene being associated, through different first scene conversion triggers, with different target virtual scenes rendered at positions corresponding to the different first scene conversion triggers; and displaying the initial virtual scene, each first scene conversion trigger, and a target virtual scene rendered at a position corresponding to each first scene conversion trigger.

Optionally, the method further includes:

determining, in a case that a position of a virtual object reaches a position of any specified one of the at least two first scene conversion triggers, the target virtual scene and the second scene conversion trigger associated with the target virtual scene based on the initial virtual scene and the specified first scene conversion trigger.

Optionally, the method further includes:

rendering a plurality of different target virtual scenes in the same coordinate system, the target virtual scenes belonging to the virtual scene set.

Optionally, the partial information of the target virtual scene further includes index information of the target virtual scene, and the method further includes:

displaying the index information of the target virtual scene;

receiving a selection operation for selecting a target virtual scene inputted by using the target index information; and rendering a selected target virtual scene according to the selection operation.

Optionally, in a case that there are X virtual scenes between the initial virtual scene and the selected target virtual scene, X being a natural number, before the rendering a selected target virtual scene according to the selection operation, the method further includes:

determining, according to the selection operation, a path for rendering the selected target virtual scene, the path including the X virtual scenes; and successively rendering the X virtual scenes according to the selection operation until the selected target virtual scene is rendered.

Optionally, in a case that the target virtual scene belongs to a virtual scene set, the method further includes:

receiving the virtual scene set transmitted by a server.

An embodiment of this application further provides a computer storage medium configured to store a computer software instruction used for a terminal, the instruction including a program to be executed by an apparatus configured to implement scene conversion in the above method embodiment.

It may be clearly understood by persons skilled in the art that for convenience and brevity of description, for a detailed working process of the foregoing system, apparatus, and unit, reference may be made to a corresponding process in the foregoing method embodiments, and details are not described herein again.

In the several embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the existing technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disk.

The foregoing embodiments are merely provided for describing the technical solutions of this application, but not intended to limit this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of this application.

What is claimed is:

1. A method for implementing virtual scene conversion, applied to a terminal, the method comprising:
displaying an initial virtual scene, a first scene conversion trigger set, and partial information of at least one target virtual scene in a screen area, a scene conversion trigger being used for implementing conversion between associated different virtual scenes, and the first scene conversion trigger set comprising at least one first scene conversion trigger associated with the initial virtual scene, wherein two scene conversion triggers adjacent in spatial order are associated with a same target virtual scene, and every two scene conversion triggers adjacent in spatial order are arranged in series;
determining, in a case that a trigger operation on a first scene conversion trigger in the first scene conversion trigger set is received, a target virtual scene from the at least one target virtual scene and a second scene conversion trigger set based on the trigger operation, the second scene conversion trigger set comprising at least one second scene conversion trigger associated with the target virtual scene; and
rendering the determined target virtual scene and the second scene conversion trigger set, and displaying the determined target virtual scene and the second scene conversion trigger set in the screen area.

2. The method according to claim 1, wherein the initial virtual scene and the at least one target virtual scene each comprises an augmented reality scene, a virtual reality scene, or a mixed reality scene.

3. The method according to claim 1, wherein each of the at least one target virtual scene belongs to a virtual scene set comprising a plurality of three-dimensional virtual scenes, and before displaying the initial virtual scene, the first scene conversion trigger set, and the partial information of at least one target virtual scene in the screen area, the method further comprises:
performing dimensionality reduction on all three-dimensional virtual scenes in the virtual scene set to obtain two-dimensional planar scenes corresponding to the three-dimensional scenes respectively; and
overlaying the two-dimensional planar scenes respectively corresponding to all of the three-dimensional scenes so that different virtual scenes are associated through scene conversion triggers.

4. The method according to claim 1, wherein the screen area comprises a first virtual area and a second virtual area, the first virtual area being used for displaying the initial virtual scene and the first scene conversion trigger set, the second virtual area being used for displaying the partial information of at least one target virtual scene, the first virtual area and the second virtual area constituting the entire screen area; and wherein displaying the initial virtual scene, the first scene conversion trigger set, and partial information of at least one target virtual scene in a screen area comprises:
determining a viewing angle and a position of a virtual object in the initial virtual scene;
loading, in the first virtual area, a first image and a first scene conversion trigger set corresponding to the initial virtual scene at the viewing angle and the position of the virtual object; and
loading, in the second virtual area, a second image corresponding to the target virtual scene associated with the initial virtual scene at the viewing angle and the position of the virtual object.

5. The method according to claim 1, further comprising:
collecting, in a case that the initial virtual scene comprises a real scene, a first real scene image in the real scene through a camera;
overlaying at least two first scene conversion triggers and partial information of at least two target virtual scenes onto the first real scene image to obtain a hybrid virtual-real image; and
displaying the hybrid virtual-real image.

6. The method according to claim 1, wherein the initial virtual scene is associated with at least two first scene conversion triggers, one of the at least two first scene conversion triggers being a virtual-real scene conversion trigger used for switching between the initial virtual scene and a real scene as the determined target virtual scene; and the method further comprises:
collecting a second real scene image in the real scene through a camera; and
overlaying the second real scene image at a position of the virtual-real scene conversion trigger.

7. The method according to claim 6, further comprising:
when determining the virtual-real scene conversion trigger in the initial virtual scene is received, collecting a third real scene image in the real scene according to a real-time angle and a real-time position of the camera; and
displaying the third real scene image in the real scene as the determined target virtual scene.

8. The method according to claim 1, wherein determining that the trigger operation on the first scene conversion trigger is received comprises:
when a position of a virtual object reaches a position of the first scene conversion trigger, determining that the trigger operation on the first scene conversion trigger is received.

9. The method according to claim 8, wherein the determined target virtual scene comprise a first target virtual scene, and rendering the determined target virtual scene and second scene conversion trigger set, and displaying the determined target virtual scene and second scene conversion trigger set in the screen area comprises:
rendering the first target virtual scene and a second scene conversion trigger set associated with the first target virtual scene, displaying the first target virtual scene and the second scene conversion trigger set associated with the first target virtual scene in the screen area, and changing the first target virtual scene to the initial virtual scene and the second scene conversion trigger set associated with the first target virtual scene to the first scene conversion trigger set in the initial virtual scene.

10. The method according to claim 9, further comprising:
when the position of the virtual object reaches the position of the first scene conversion trigger in the initial virtual scene, determining to trigger the first scene conversion trigger in the initial virtual scene;
determining, according to the first scene conversion trigger, to switch the initial virtual scene to a second target virtual scene associated with the first scene conversion trigger in the initial virtual scene and a second scene conversion trigger set associated with the second target virtual scene;
rendering and displaying, in the screen area, the second target virtual scene and the second scene conversion trigger set associated with the second target virtual scene; and
changing the second target virtual scene to the initial virtual scene and the second scene conversion trigger set associated with the second target virtual scene to the first scene conversion trigger set in the initial virtual scene.

11. The method according to claim 1, wherein the initial virtual scene comprises at least two first scene conversion triggers arranged in parallel; and
displaying the initial virtual scene, the first scene conversion trigger set, and the partial information of at least one target virtual scene in the screen area comprises:
displaying at least two first scene conversion triggers in the initial virtual scene in the screen area;
rendering partial information of one target virtual scene at a position of each first scene conversion trigger, the initial virtual scene being associated, through different first scene conversion triggers, with different target virtual scenes rendered at positions corresponding to the different first scene conversion triggers; and
displaying the initial virtual scene, each first scene conversion trigger, and the partial information rendered at a position corresponding to each first scene conversion trigger.

12. The method according to claim 11, further comprising:
determining, in a case that a position of a virtual object reaches a position of any specified one of the at least two first scene conversion triggers, the target virtual scene and the second scene conversion trigger associated with the target virtual scene based on the initial virtual scene and the specified first scene conversion trigger.

13. The method according to claim 1, further comprising:
rendering a plurality of different target virtual scenes in a same coordinate system, the different target virtual scenes belonging to a virtual scene set.

14. The method according to claim 1, wherein the partial information of at least one target virtual scene further comprises index information of the target virtual scene, and the method further comprises:
displaying the index information of the target virtual scene;
receiving a selection operation for selecting a target virtual scene inputted by using the index information; and
rendering a selected target virtual scene according to the selection operation.

15. The method according to claim 14, wherein in a case that there are X virtual scenes between the initial virtual scene and the selected target virtual scene, X being a natural number, before the rendering a selected target virtual scene according to the selection operation, the method further comprises:
determining, according to the selection operation, a path for rendering the selected target virtual scene, the path comprising the X virtual scenes; and
successively rendering the X virtual scenes according to the selection operation until the selected target virtual scene is rendered.

16. The method according to claim 1, wherein in a case that the target virtual scene belongs to a virtual scene set, the method further comprises:
receiving the virtual scene set transmitted by a server.

17. An apparatus for implementing virtual scene conversion, applied to a terminal, comprising a memory for storing computer readable instructions and a processor in communication with the memory, wherein the processor is configured to execute the computer readable instructions to cause the apparatus to:
display an initial virtual scene, a first scene conversion trigger set, and partial information of at least one target virtual scene in a screen area, a scene conversion trigger being used for implementing conversion between associated different virtual scenes, and the first scene conversion trigger set comprising at least one first scene conversion trigger associated with the initial virtual scene, wherein two scene conversion triggers adjacent in spatial order are associated with a same target virtual scene, and every two scene conversion triggers adjacent in spatial order are arranged in series;
determine, in a case that a trigger operation on a first scene conversion trigger in the first scene conversion trigger set is received, a determined target virtual scene from the at least one target virtual scene and a second scene conversion trigger set based on the trigger operation, the second scene conversion trigger set comprising at least one second scene conversion trigger associated with the determined target virtual scene;
render the determined target virtual scene and the second scene conversion trigger set; and
display the determined target virtual scene and the second scene conversion trigger set in the screen area.

18. The apparatus according to claim 17, wherein the initial virtual scene and the at least one target virtual scene may be an augmented reality scene, a virtual reality scene, or a mixed reality scene.

19. A non-transitory storage medium for storing computer readable instructions, the computer readable instructions, when executed by one or more processors, causing the one or more processors to:
- display an initial virtual scene, a first scene conversion trigger set, and partial information of at least one target virtual scene in a screen area, a scene conversion trigger being used for implementing conversion between associated different virtual scenes, and the first scene conversion trigger set comprising at least one first scene conversion trigger associated with the initial virtual scene, wherein two scene conversion triggers adjacent in spatial order are associated with a same target virtual scene, and every two scene conversion triggers adjacent in spatial order are arranged in series;
- determine, in a case that a trigger operation on a first scene conversion trigger in the first scene conversion trigger set is received, a determined target virtual scene from the at least one target virtual scene and a second scene conversion trigger set based on the trigger operation, the second scene conversion trigger set comprising at least one second scene conversion trigger associated with the determined target virtual scene;
- render the determined target virtual scene and the second scene conversion trigger set; and
- display the determined target virtual scene and the second scene conversion trigger set in the screen area.

* * * * *